(12) United States Patent
Bailey

(10) Patent No.: US 12,488,402 B2
(45) Date of Patent: Dec. 2, 2025

(54) CUSTOMER-FRIENDLY SMART DINING TABLE

(71) Applicant: Maurice Bailey, Hoschton, GA (US)

(72) Inventor: Maurice Bailey, Hoschton, GA (US)

( * ) Notice: Subject to any disclaimer, the term of this patent is extended or adjusted under 35 U.S.C. 154(b) by 0 days.

(21) Appl. No.: 19/032,681

(22) Filed: Jan. 21, 2025

(65) Prior Publication Data

US 2025/0166099 A1    May 22, 2025

Related U.S. Application Data

(63) Continuation-in-part of application No. 18/801,366, filed on Aug. 12, 2024, now Pat. No. 12,239,246.

(51) Int. Cl.
| | |
|---|---|
| G06Q 50/12 | (2012.01) |
| G06F 3/0482 | (2013.01) |
| G06F 3/0484 | (2022.01) |
| G06F 3/0488 | (2022.01) |
| G06F 3/16 | (2006.01) |

(52) U.S. Cl.
CPC ......... *G06Q 50/12* (2013.01); *G06F 3/0482* (2013.01); *G06F 3/0484* (2013.01); *G06F 3/0488* (2013.01); *G06F 3/167* (2013.01); G06F 2203/04803 (2013.01)

(58) Field of Classification Search
CPC ..... G06Q 50/12; G06F 3/0482; G06F 3/0484; G06F 3/0488; G06F 3/167; G06F 2203/04803
See application file for complete search history.

(56) References Cited

U.S. PATENT DOCUMENTS

| | | | |
|---|---|---|---|
| 9,384,495 B1 | 7/2016 | Cope et al. | |
| 9,652,773 B1 * | 5/2017 | Dublin, III | G02F 1/1336 |
| 10,282,713 B2 * | 5/2019 | Ham | G06Q 20/20 |

(Continued)

FOREIGN PATENT DOCUMENTS

| | | |
|---|---|---|
| CN | 101785603 A | 7/2010 |
| CN | 202179281 U | 4/2012 |

(Continued)

OTHER PUBLICATIONS

Spence, Charles, et al. "Technology at the dining table." Flavor, 2013, vol. 2-16. https://doi.org/10.1186/2044-7248-2-16.

*Primary Examiner* — A. Hunter Wilder
(74) *Attorney, Agent, or Firm* — Abhijit B. Sadananda

(57) ABSTRACT

Various versions of a customer-friendly smart dining table are disclosed for streamlining all processes and meeting customer needs and interests from food ordering to delivery directly on the table. The table may comprise an interactive interface capable of receiving touch-based inputs, voice-based inputs, or both from patron(s) and displaying output(s) respectively. The interface may comprise a feedback module to provide automated assistance to the patron(s) in food selection and customization of the menu, an order management module to allow the patron(s) to place food orders, a payment module to enable the patron(s) to complete payments directly from the table, a power management module to manage power usage and ambient lighting, and a leisure module to interact with various entertainment options. The interface may be capable of concurrently processing inputs from a plurality of patrons seated at the table.

16 Claims, 14 Drawing Sheets

(56) References Cited

U.S. PATENT DOCUMENTS

| | | |
|---|---|---|
| 11,397,956 B1* | 7/2022 | Eidam ................ G06F 3/04883 |
| 11,556,298 B1 | 1/2023 | Seger, Jr. et al. |
| 2002/0149239 A1 | 10/2002 | Koljonen |
| 2006/0112335 A1 | 5/2006 | Hofmeister et al. |
| 2008/0040692 A1* | 2/2008 | Sunday ............... G06F 3/04883 |
| | | 715/863 |
| 2011/0187664 A1* | 8/2011 | Rinehart ................ G06F 3/041 |
| | | 345/173 |
| 2011/0218867 A1 | 9/2011 | Cerrato |
| 2012/0251756 A1 | 10/2012 | Buckley |
| 2019/0102830 A1 | 4/2019 | Yin et al. |

FOREIGN PATENT DOCUMENTS

| | | |
|---|---|---|
| CN | 202908152 U | 5/2013 |
| CN | 203073610 U | 7/2013 |
| CN | 203118057 U | 8/2013 |
| CN | 203290444 U | 11/2013 |
| CN | 204734096 U | 11/2015 |
| CN | 105224901 A | 1/2016 |
| CN | 106805500 A | 6/2017 |
| CN | 219330986 U | 7/2023 |
| CN | 118069091 A | 5/2024 |

* cited by examiner

CUSTOMER-FRIENDLY SMART DINING TABLE

CROSS-REFERENCE TO RELATED APPLICATION

The present invention is a continuation-in-part of U.S. patent application Ser. No. 18/801,366, filed on Aug. 12, 2024.

TECHNICAL FIELD

The present invention relates to the field of smart tables. More specifically, the present invention relates to the field of smart dining tables. Even more specifically, the present invention relates to a customer-friendly smart dining table for automating and streamlining all food ordering processes in restaurants and meeting customer needs and interests from food ordering to delivery directly through the table.

BACKGROUND

Restaurant patrons often face several challenges that diminish their dining experience. One challenge is the inherent inadequacy of the food ordering process. For instance, patrons are required to either go to the counter or wait for the staff to take their order. Furthermore, once their orders are placed, patrons do not have a way to inquire about the status of their order or the estimated time until delivery without relying on the restaurant staff. This becomes particularly problematic during peak hours when a restaurant is crowded or understaffed, leading to extended waiting times.

Another challenge is that the hygiene standards of restaurant tables are often inadequate. The quick turnover of customers results in insufficient cleaning between sittings, allowing microbes to spread. This lack of proper hygiene management can compromise the health and safety of both patrons and restaurant staff.

Yet another challenge is that the waiting experience from food ordering to delivery is not designed to be customer-friendly. During this period, patrons are often left with nothing to do, as there are no entertainment options or interactive activities to help them pass the time while waiting for their food to arrive.

Addressing these issues would significantly enhance the overall dining experience, making it more efficient, enjoyable, and hygienic for restaurant patrons.

BRIEF SUMMARY

The present invention relates to a customer-friendly smart dining table for automating and streamlining all food ordering processes in restaurants and meeting customer needs and interests from food ordering to delivery directly on and directly through the table.

The principal objective of the present invention is to overcome the disadvantages of the prior art.

An objective of the present invention is to provide a smart dining table that automates and streamlines the food ordering process in restaurants.

Another objective of the present invention is to provide a smart dining table that improves the experience of the patrons seated in the restaurants.

Another objective of the present invention is to provide a smart dining table that is self-capable of maintaining high hygiene standards.

Yet another objective of the present invention is to empower patrons to meet their needs directly through their smart tables during the food ordering process.

According to an embodiment, the customer-friendly smart dining table comprises a table frame and an interactive interface on the top of the frame. The interface may be capable of simultaneously receiving touch-based inputs, voice-based input, or both from one or more patron(s) and simultaneously providing output(s) to one or more patrons. The interface may have antimicrobial properties to maintain hygiene. The interface may further provide ambient lighting that is adjustable based on the time of the day and current ambiance settings of the surroundings. The interface may further comprise: a feedback module configured for providing automated assistance to the patron(s) in food selection and customization of the menu based on their preference(s); a leisure module that includes a set of interactive applications, operable for elevating the patron experience by offering entertainment and interaction options; a payment module that includes a plurality of payment methods, operable for enabling the patron(s) to complete payments directly from the interface; a power management module configured for managing and optimizing the power inflow and outflow of the interface; and a processing unit configured for processing all the inputs and outputs of/within the interface.

According to an embodiment, the interactive interface further comprises a touch sensitive screen for receiving the touch inputs.

According to an embodiment, the interface further comprises a voice recognition system utilizing advanced techniques to interpret voice inputs including but not limited to Automatic Speech Recognition (ASR), Natural Language Processing (NLP), Text to Speech (TTS), Voice Biometrics, Voice command interfaces, Speech to text (STT) engines and Voice User Interface (VUI).

According to an embodiment, the top of the table frame is treated with one or more antimicrobial agents during manufacturing or post-production to functionalize the antimicrobial properties.

According to an embodiment, the interface further comprises one or more light sensors integrated with the processing unit for functionalizing adjustable ambient lighting.

According to an embodiment, the feedback module is trained through a machine learned neural network method for enabling automated assistance on food selection and customization of menu.

According to an embodiment, the leisure module is connected to at least one camera, at least one microphone and at least one speaker for interacting with the set of interactive applications.

According to an embodiment, the plurality of payment methods in the payment module enable both contact-based and contactless payments.

According to an embodiment, the power management module further comprises externally powered backup power sources, rechargeable backup power sources, or both.

According to an embodiment, the power management module further comprises an energy management unit incorporating one or more sensors and one or more modes of operation for saving power outflow.

According to an embodiment, the interface is integrated with an order management system which is integrated with the operational workflow of restaurant staff for programmed alarming, two-way communication, or both between the patron(s) and the restaurant staff.

According to an embodiment, the order management system is connected to at least one camera, at least one microphone, and at least one speaker on the table for two-way communication.

While the invention has been described and shown with particular reference to the preferred embodiment, it will be apparent that variations might be possible that would fall within the scope of the present invention.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

As used in the description herein and throughout the claims that follow, the meaning of "a," "an," and "the" includes plural reference unless the context clearly dictates otherwise. Also, as used in the description herein, the meaning of "in" may include "in" and "on," and the meaning of "on" may include "on" and "in," unless the context clearly dictates otherwise.

If the specification states a component or feature "may", "can", "could", or "might" be included or have a characteristic, that particular component or feature is not required to be included or have the characteristic.

The terms "includes" and "including" should be interpreted as referring to elements, components, or steps in a non-exclusive manner, indicating that the referenced elements, components, or steps may be present, or utilized, or combined with other elements, components, or steps that are not expressly referenced.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

The present invention comprises systems and methods related to a smart dining table for automating and streamlining all food ordering processes in restaurants and meeting customer needs and interests from food ordering to delivery to payment directly on the table through a smart table interface.

Figure 1:
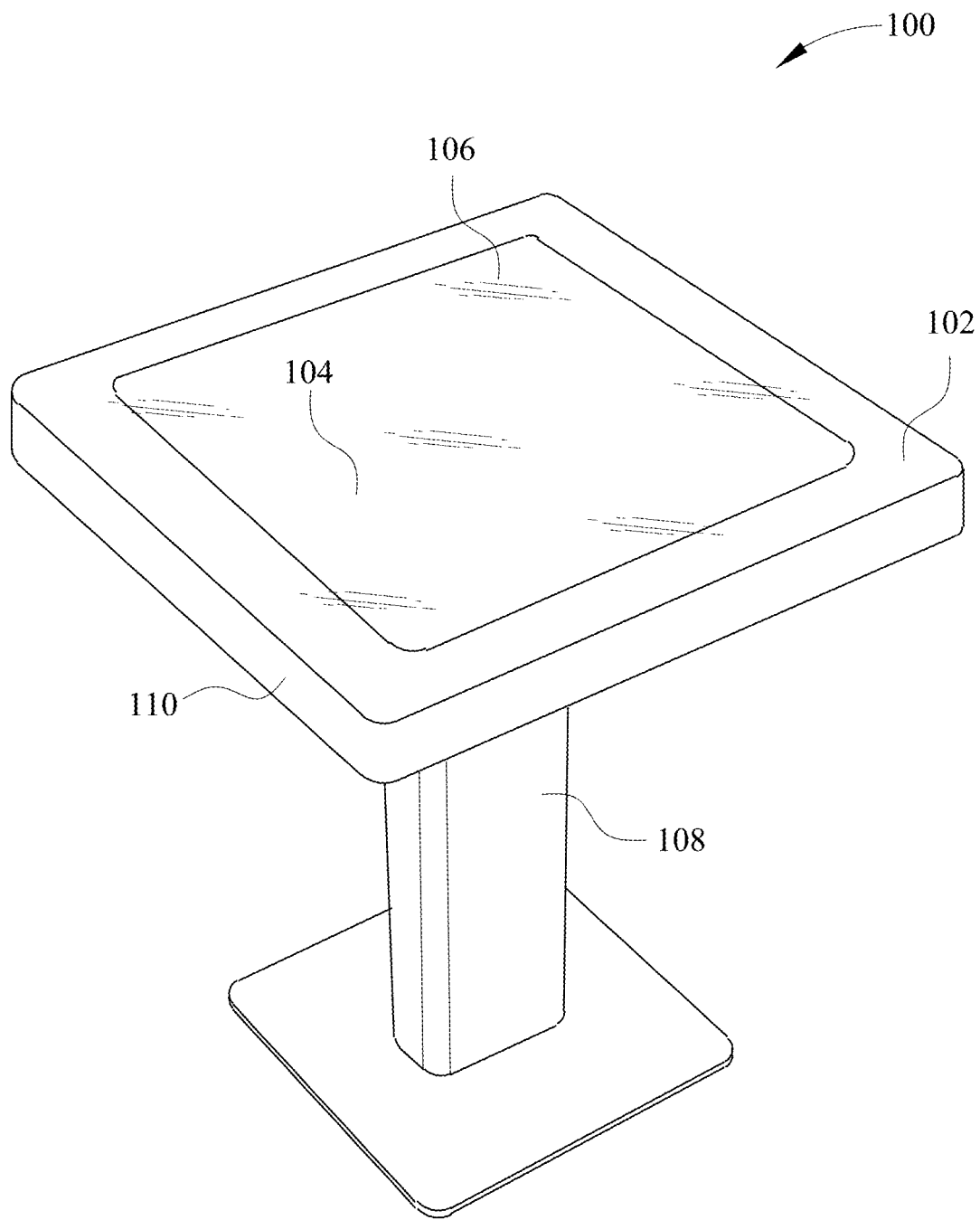
FIG. 1 illustrates an example isometric view of a smart dining table, in accordance with the present disclosure.

FIG. 1 illustrates an isometric view of an exemplary smart dining table in accordance with the present disclosure. The smart dining table 100 may comprise a robust table frame 108 as its base structure, providing stable support from the ground level. According to some embodiments, table frame 108 may be designed to provide connections and/or housing for power supply components or other hardware components of the table 100 (see, e.g., FIGS. 4A-4C). The design, dimensional configurations, and materials used for making the table frame 108 may vary depending on a plurality of factors such as preferences of a particular restaurant, height of the chair(s), design choices, availability of material, skill and style of manpower, etc.

The smart dining table 100 may further comprise an interactive interface 102 on top of the table frame 108. As discussed herein, the interface 102 may be configured to provide various functionalities for automating and streamlining the customer experience from food ordering to delivery directly through the table. The interface 102 may comprise a casing (see, e.g., FIGS. 4B and 5B) to house internal circuitry and other hardware components of the table 100. Additionally or alternatively, the table frame 108 may be designed to provide an expanded mounting surface and/or housing for one or more components of interface 102. The interface 102 may be affixed to the table frame 108 or it may be detachable, as per user requirements. For instance, the interface 102 may comprise a mounting means (see e.g., FIG. 5B) which enables the user to attach and detach the interface 102 to/from the table frame 108. This may be advantageous, for example, in embodiments where the interface 102 comprises a rechargeable power supply (see, e.g., FIG. 5C).

The interface 102 may comprise one or more touch-sensitive screens 104 for interacting with one or more users. The touch-sensitive screen 104 may be configured to simultaneously receive independent inputs from a plurality of users. For example, if four persons are seated around the table 100, each person may independently provide touch-based inputs to the interface 102 simultaneously by interacting with one or more portions of the touch-sensitive screen 104. Touchscreen technologies used for receiving touch-based inputs via the touch-sensitive screen 104 may include, for example, capacitive touch screen, resistive touch screen, infrared touch screen, surface acoustic wave (SAW) touch screen, optical imaging display, or the like.

According to an embodiment, touch-sensitive screens 104 may comprise one or more of a Light Emitting Diode (LED) Display, a Liquid Crystal Display (LCD), an Organic Light Emitting display (OLED), an Active Matrix Organic Light Emitting Diode (AMOLED) Display, a Micro Light Emitting Diode (MicroLED) Display, a Quantum Dot Display, a Miniature Light Emitting Diode (Mini-LED) display, a Laser Phosphor Display (LPD), an Electronic Ink (E-Link) Display, a Holographic Display, a Plasma Display, or the like.

The smart dining table 100 may further comprise an antimicrobial surface 106 on top of the interactive interface 102. The antimicrobial surface 106 may have properties that enhance hygiene by ensuring the surface of the table remains clean and safe for human contact. For example, the antimicrobial surface 106 may be configured with properties that help prevent biofilm formation, reduce the microbial load of bacteria, viruses, and fungi, or the like.

According to some embodiments, the antimicrobial surface 106 is a glass surface which has been treated with one or more antimicrobial agents. For instance, a glass surface may be treated with one or more antimicrobial agents during the manufacturing stage or during the post-production stage. During the manufacturing stage, antimicrobial agents may be integrated into the glass itself by applying a liquid form of the antimicrobial agent to the glass surface and curing using heat or UV light to form a durable coating. During the post-production stage, existing glass surfaces may be treated with antimicrobial coatings through spraying or dipping processes, or adhesion may be used to ensure the antimicrobial layer adheres strongly to the glass, maintaining effectiveness over time. According to some embodiments, the antimicrobial agents used for maintaining hygiene on the table may include one or more of silver ions, copper ions, or other metal ions known for their antimicrobial properties.

The antimicrobial surface 106 may be affixed to or otherwise operably coupled with the interactive interface 102 to optimize interaction with the patron(s). According to some embodiments, the antimicrobial surface 106 may be connected to or coextensive with one or more touch-sensitive screens 104 of the interface 102 in order to enable hygienic touch-based interaction with restaurant patrons. Additionally or alternatively, the antimicrobial surface 106 may be affixed directly onto the table frame 108.

The table 100 may optionally comprise one or more trim elements 110 on the perimeter of interface 102. Trim elements 110 may be affixed to interface 102 and/or table frame 108, or they may be detachable as per user requirements. Trim elements 110 may be applied for aesthetic purposes, for instance, to cover or enclose components of the interface 102. Additionally or alternatively, one or more trim elements 110 may be configured to enable user interaction with the interface 102. For example, one or more trim elements 110 may be designed to support placement of one or more input/output devices in accordance with the present disclosure. The design, dimensional configurations, and materials used for making trim elements 110 may vary depending on a plurality of factors such as preferences of a particular restaurant, design of the interface 102 and/or the table frame 108, availability of material, skill and style of manpower, etc.

According to some embodiments, the interactive interface 102 or the table frame 108 may be designed to comprise one or more trim elements 110.

According to some embodiments, the interface may comprise multiple touch-sensitive screens for receiving touch-based inputs and displaying outputs. For example, referring to FIG. 2, a smart dining table 200 in accordance with the present disclosure may comprise an interactive interface 202 comprising two distinct touch-sensitive screens 204A and 204B. Each of the touch-sensitive screens 204A and 204B may configured to independently receive inputs from and display outputs to one or more users. For example, each of the touch-sensitive screens 204A and 204B may be configured to interact with one or more patrons on a particular side of the table 200.

The smart dining table 200 may further comprise an antimicrobial surface 206 coupled at least with touch-sensitive screens 204A and 204B in order to provide hygienic interaction with the interface 202. The smart dining table 200 may further comprise a table frame 208 as its base structure, providing structural support for the interface 202.

Figure 2:
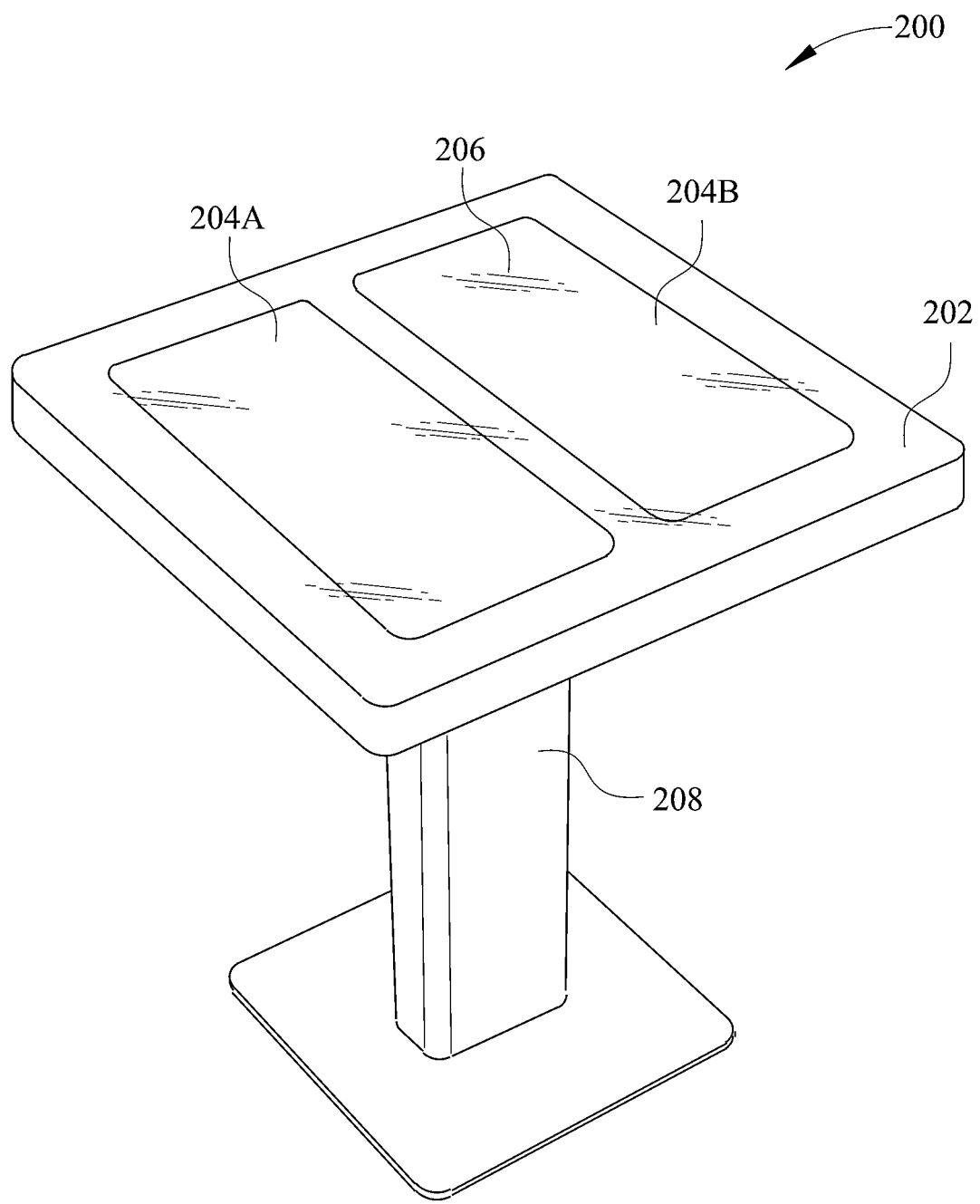
FIG. 2 illustrates an example isometric view of a smart dining table having multiple displays, in accordance with the present disclosure.
Figure 3:
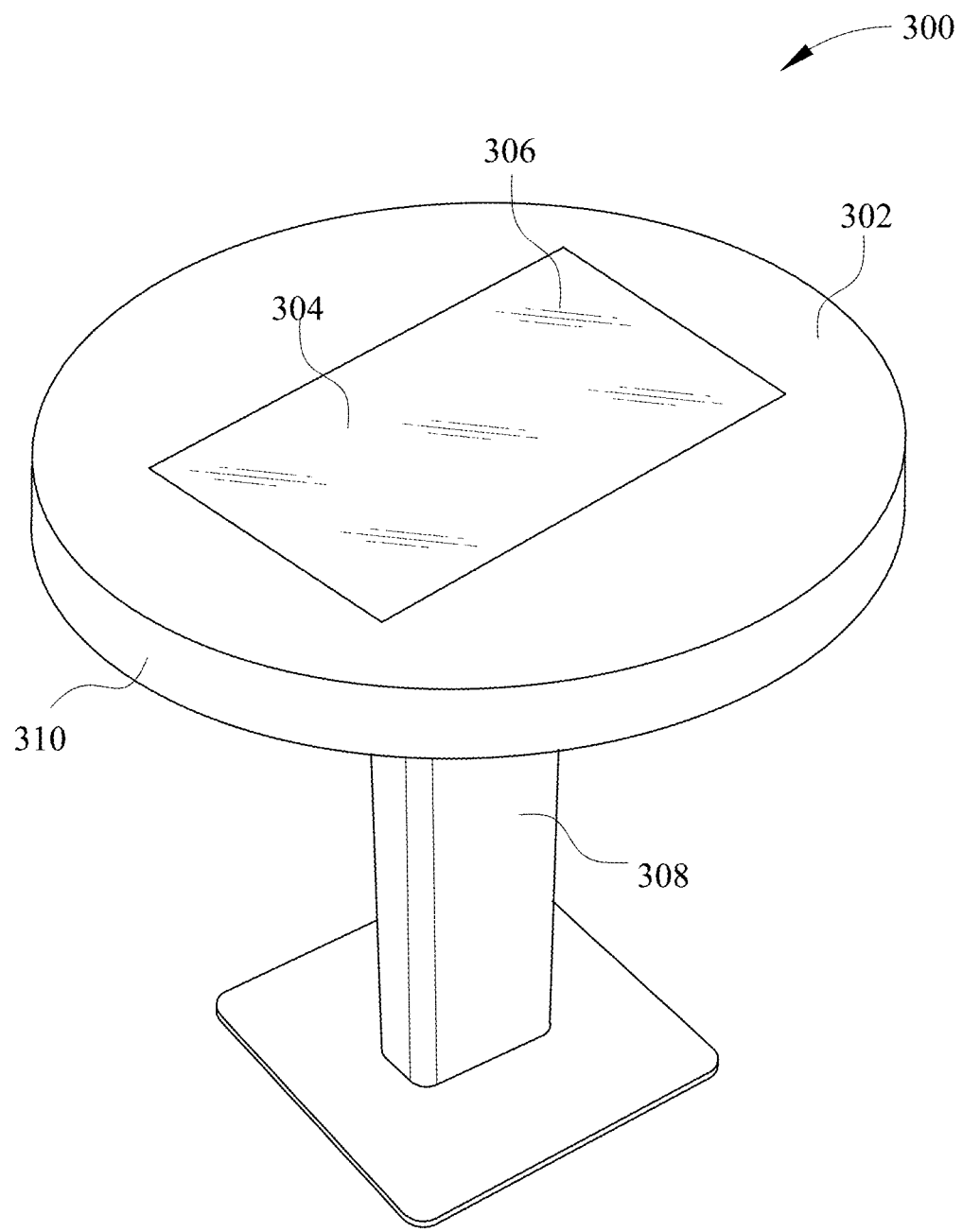
FIG. 3 illustrates an example isometric view of a smart dining table having a circular shape, in accordance with the present disclosure.

FIG. 3 illustrates certain variations in the configuration of the smart dining table in accordance with the present disclosure. For instance, while FIGS. 1 and 2 depict examples of a smart dining table having a square-shaped top, FIG. 3 illustrates an example of a smart dining table having circular top. Similarly, the top of the table may be rectangular, triangular, rhomboid, oval, hexagonal, pentagonal, octagonal, decagonal, freeform, trapezoidal, round-cornered, convertible shape, or the like.

The interface 302 may be designed to fit a table 300 of any shape. In some cases, the table frame 308 may be expanded to encompass a portion of the top of the table 300, and the interface 302 may be designed to fit into the table frame 308 accordingly. The antimicrobial surface 306 may similarly be designed to cover the breadth of the interface 302 and/or the breadth of the table frame 308. Alternatively, the antimicrobial surface 306 may be designed to cover one or more portions of interface 302, such as the portions of the interface 302 comprising the touch-sensitive screen 304 and/or other input/output devices of the table 300.

The optional trim elements 310 may also be designed to fit the shape of the interface 302 and/or the table frame 308. According to some embodiments, the interactive interface 302 or the table frame 308 may be designed to comprise the one or more trim elements 310.

Figure 4A:
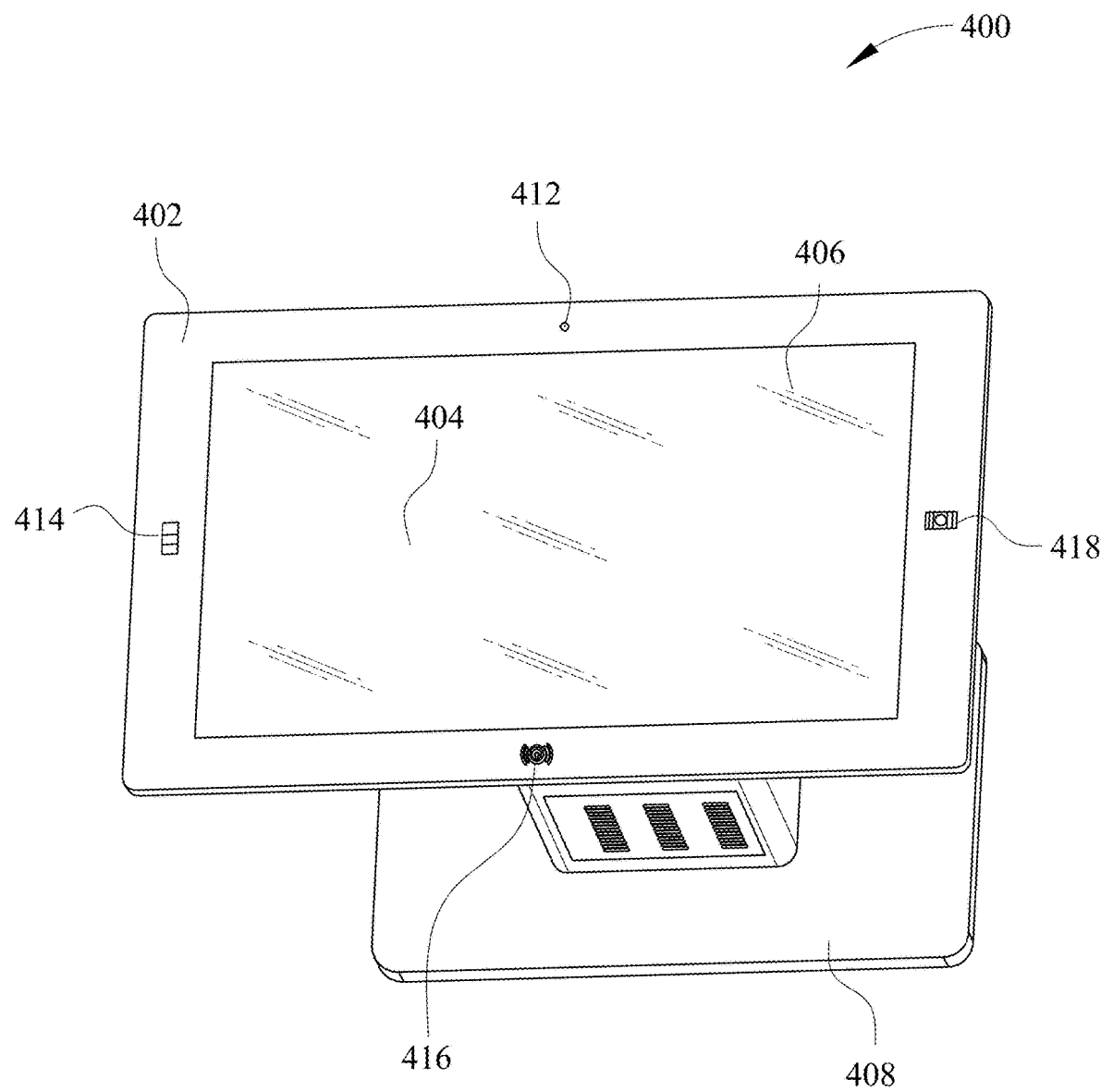
FIGS. 4A-4C illustrate an example of a smart dining table, in accordance with the present disclosure.
Figure 4B:
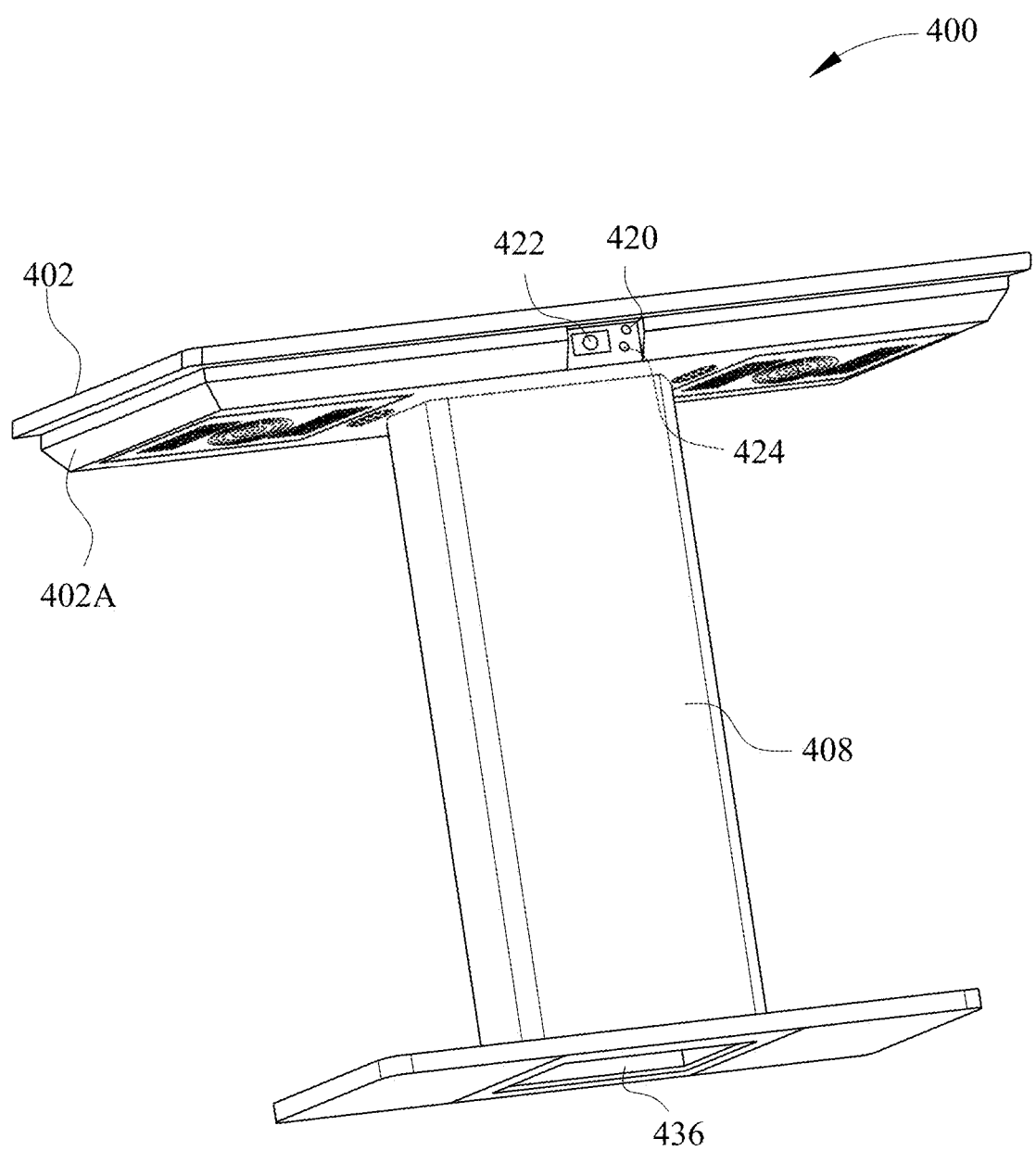
Figure 4C:
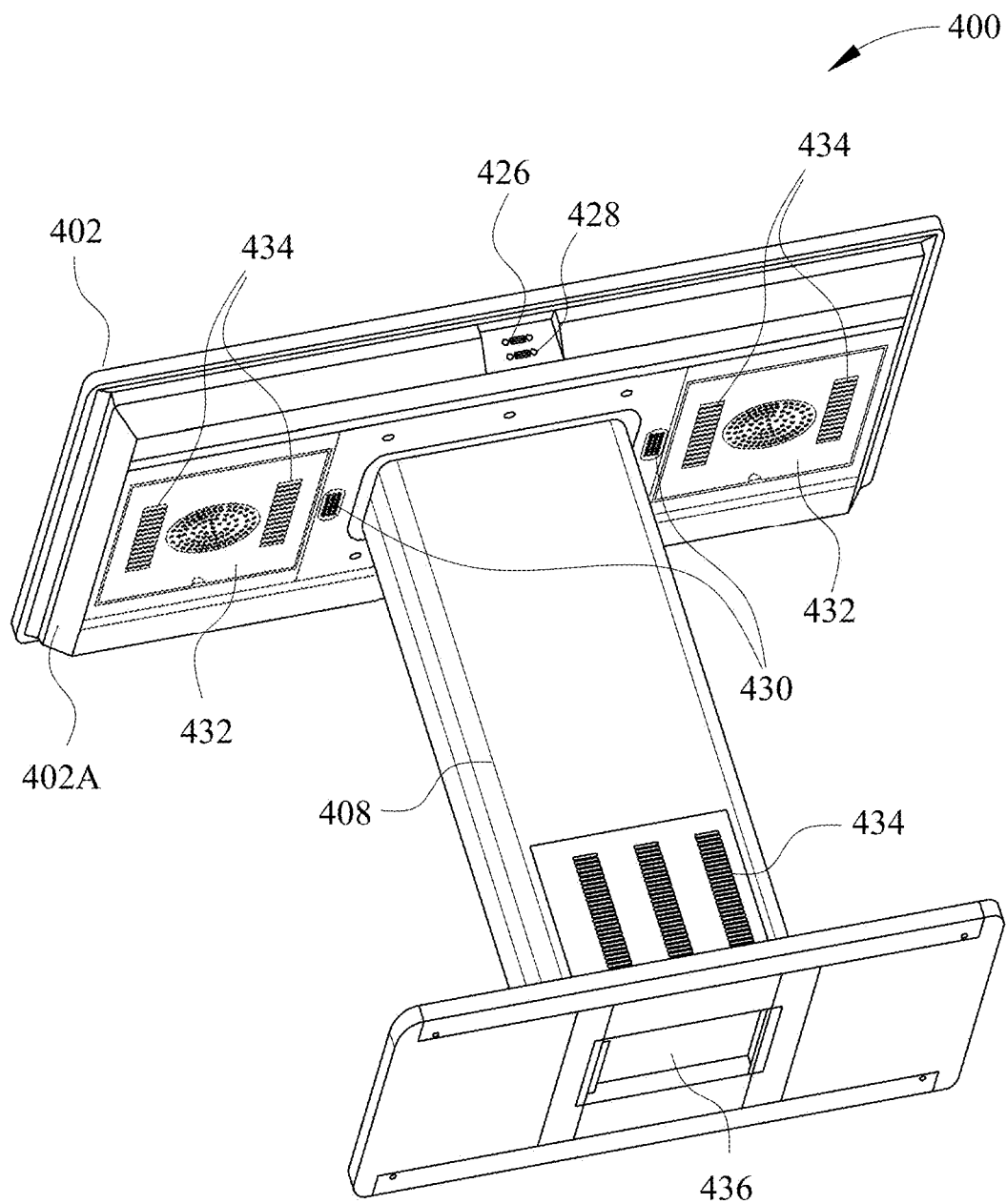

FIGS. 4A-4C further illustrate components of a smart dining table in accordance with the present disclosure. The smart dining table 400 may comprise an interactive interface 402 on top of a table frame 408. The interactive interface 402 may be affixed to table frame 408 in a substantially permanent manner, or it may be detachable as per user requirements. The table 400 may comprise one or more touch-sensitive screens 404 and an antimicrobial surface 406.

The table 400 may further comprise one or more cameras 412 for enabling image- and/or video-based communication between the interface 402 and one or more users. For instance, one or more cameras 412 may be positioned on the table such that one or more patrons at the table may independently communicate with interface 402. Cameras 402 may be affixed to the interface 402, as shown, or may be affixed elsewhere on the table 400. One or more cameras 412 may also be detachable as per user requirements.

The smart table 400 may further comprise one or more payment devices 414 to enable users to complete payments directly at the table 400. Payment devices 414 may comprise one or more contact-based payment devices, contactless payment devices, or combined contact-based and contactless payment devices. Payment devices 414 may be affixed to the top of the interface 402, as shown, or may be affixed elsewhere on the table 400 such that they are accessible to users at the table. For instance, one or more payment devices 414 may be affixed on the perimeter of interface 402 or on the table frame 408. In some embodiments, one or more payment devices 414 may be detachable as per user requirements.

Each payment device 414 may be configured to receive one or more forms of payment from users. For example, a payment device 414 may be configured to receive one or more forms of contact-based payment such as cash deposits, credit/debit card payments, pin-based transactions, magnetic stripe card payments, or the like. Additionally or alternatively, a payment device 414 may be configured to receive one or more forms of contact-less payment including: contactless debit/credit cards, such as cards equipped with Near Field Communication (NFC) technology; payments through mobile wallets, such as Amazon Pay, Google Pay, and Samsung Pay; QR code based payments like Alipay and WeChat Pay; NFC-enabled tap-to-pay transactions; Radio Frequency Identification (RFID) payments; Bluetooth payments including Beacons, Poynt, or the like; Biometric payments including Amazon One; and other online payment gateways including Paypal, Stripe, Square, or the like.

The smart dining table 400 may further comprise one or more sensors 416 for detecting conditions in the surrounding environment. According to some embodiments, sensors 416 may be light sensors configured to detect the intensity and/or color of the surrounding light. The sensors 416 may be located on table frame 408 near the interface 402, or they may be integrated into the interface 402.

The smart dining table 400 may further comprise one or more wireless charging ports 418 for charging electronic devices such as cell phones or tablets.

Referring to FIG. 4B, the smart dining table 400 may further comprise a casing 402A which houses the internal circuitry of the interface 402. The casing 402A may further be designed to support placement of one or more components of the table 400, as discussed herein.

The table 400 may further comprise one or more microphones 420 for capturing audio inputs from one or more users. For example, one or more microphones 420 may be positioned on the table 400 to receive voice-based inputs from patrons seated around the table.

Smart dining table 400 may further comprise one or more interface status indicators 422 configured to continuously measure and display the voltage, the charge and discharge current, the energy consumed, the remaining battery capacity, or the like.

Smart dining table 400 may further comprise one or more power switches 424 that operate one or more power modes of the interface. For example, a power switch 424 may activate one or more functions such as ON/OFF, sleep mode, low-energy mode, or the like.

Referring to FIG. 4C, smart dining table 400 may further comprise one or more wired charging ports 426 for charging electronic devices. Wired charging ports 416 may comprise, for example, Universal Serial Bus (USB) ports.

Smart dining table 400 may further comprise one or more wired internet connection ports 428 to provide hardwired internet access for electronic devices. Additionally or alternatively, smart dining table 400 may comprise one or more wireless internet connection ports (not shown) to provide wireless internet access to patrons.

Smart dining table 400 may further comprise one or more speakers 430 for providing audio output. For example, one or more speakers may be positioned on the table to deliver audio output from interface to one or more persons at the table. Speakers 430 may be affixed to the table frame 408 or they may be integrated into the interface 402.

Smart dining table 400 may further comprise one or more doors 432 for enabling access to the components within the table 400. For example, one or more doors 432 may allow access to the internal circuitry and/or hardware components of the interface 402 and/or the table frame 408.

The table 400 may further comprise one or more vents 434 for cross ventilation and outflow of heat generated by the electronic components fitted inside the table 400.

The table frame 408 may be fitted with one or more conduits 436 for enabling connection between one or more components and/or housing of one or more components of the table 400. For example, a conduit 436 may be utilized to channel one or more power cords for supplying power to the interface 402. Additionally or alternatively, a conduit 436 may be utilized to house a backup power supply connected to the interface 402.

Figure 5A:
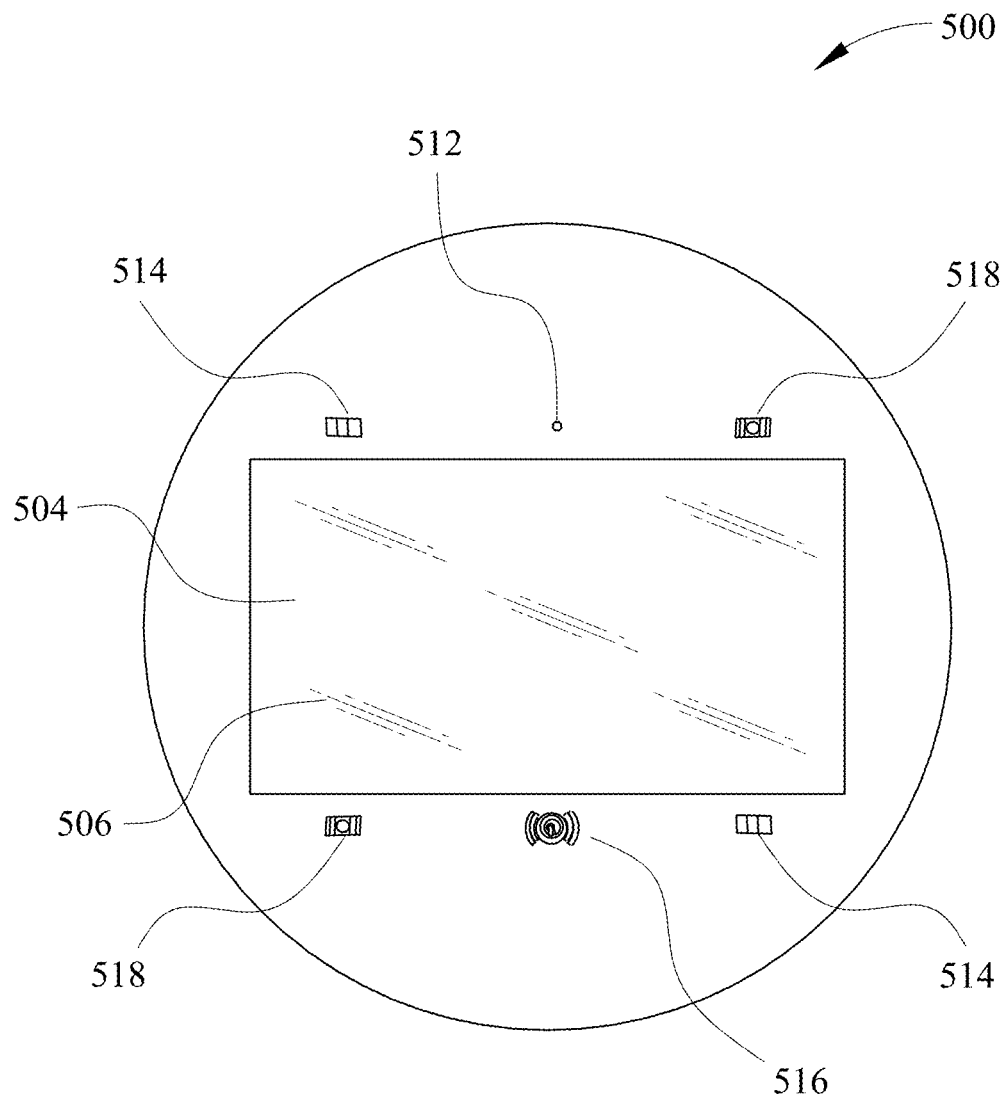
FIGS. 5A-5C illustrate an example of a detachable smart dining table interface, in accordance with the present disclosure.
Figure 5B:
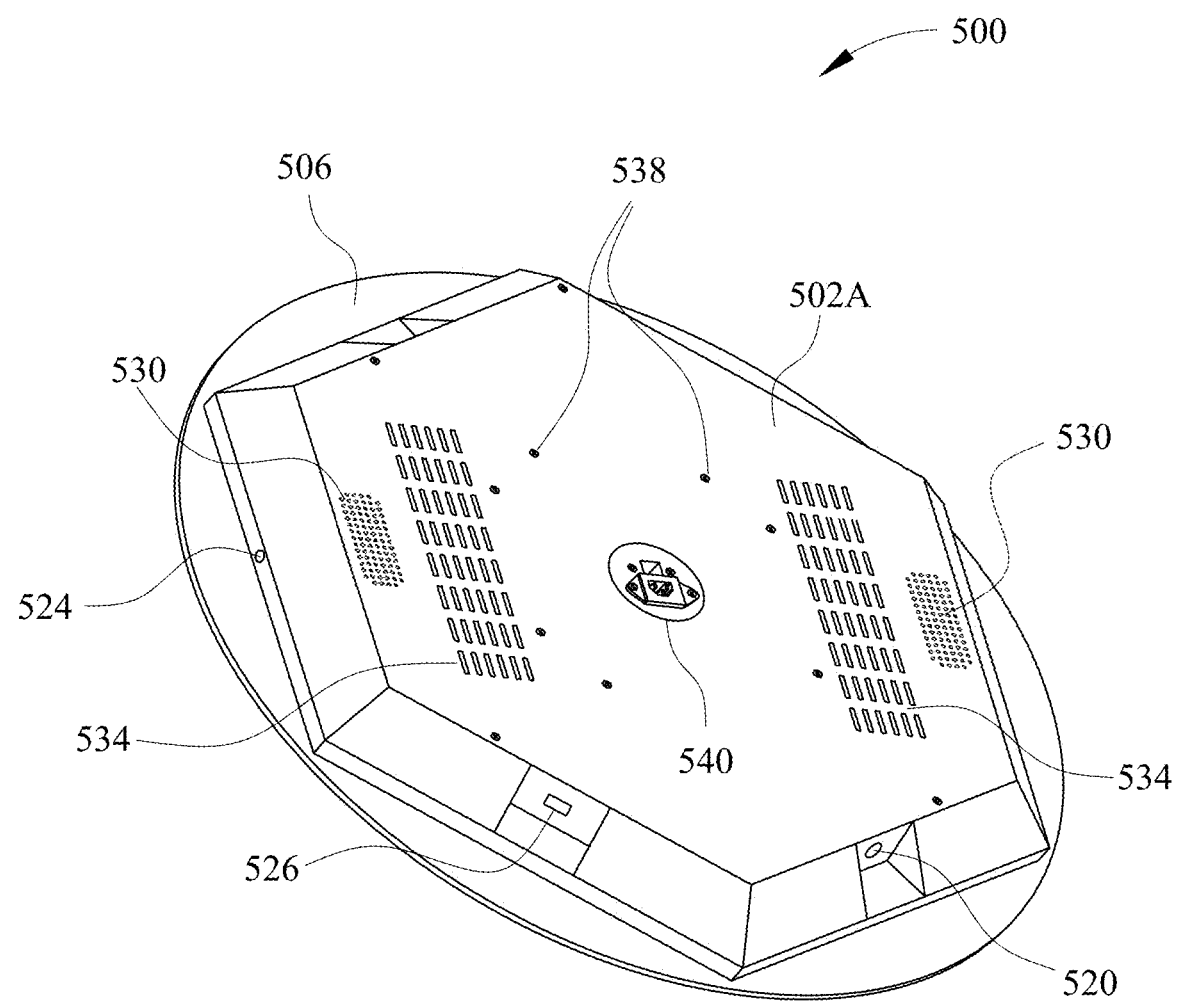
Figure 5C:
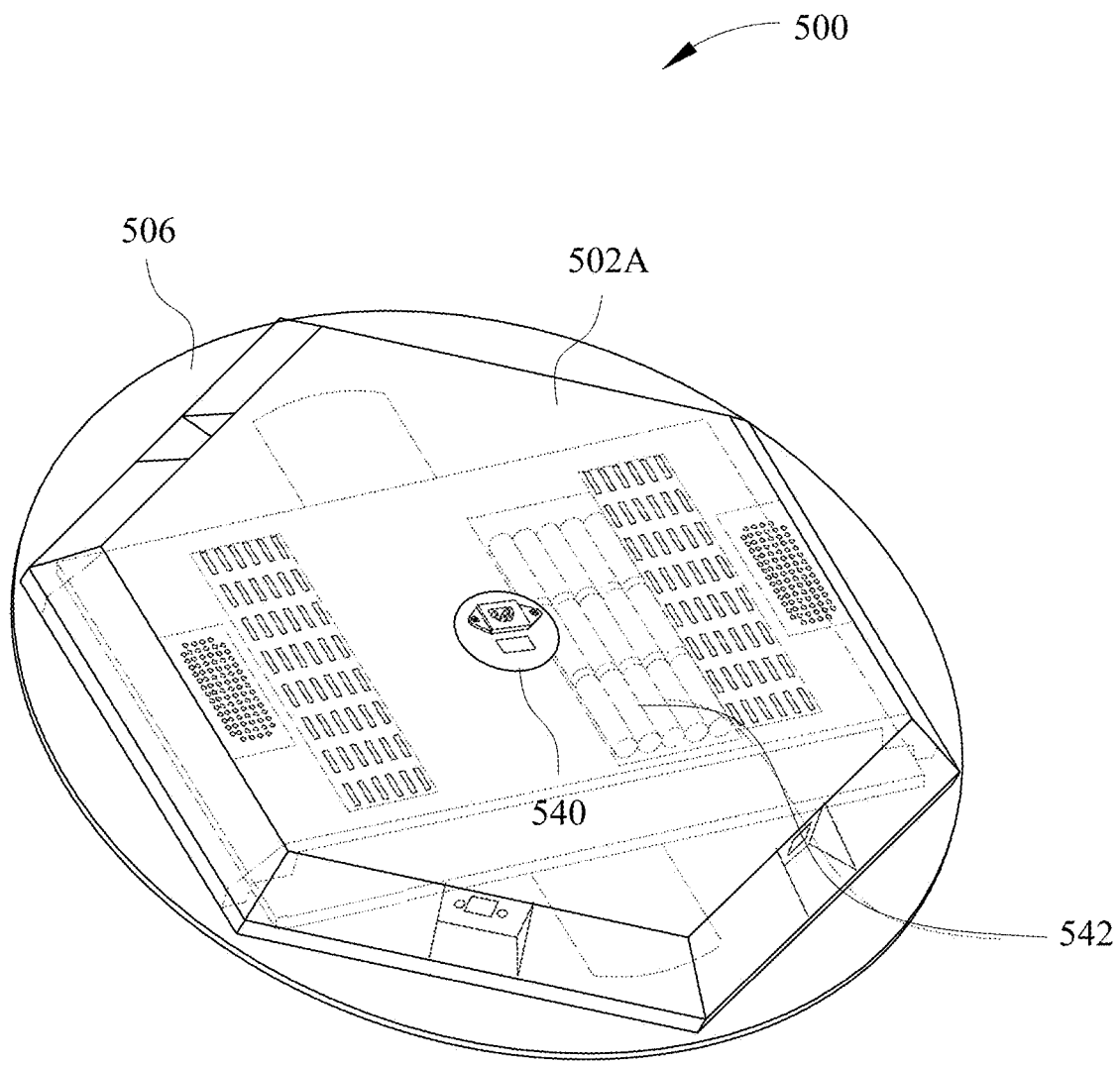

FIGS. 5A-5C illustrate components of a detachable smart dining table interface, in accordance with the present disclosure. Referring to FIG. 5A, a detachable interactive interface 500 may comprise one or more components similar to those discussed with reference to FIGS. 4A-4C, such as one or more touch-sensitive screens 504, an antimicrobial surface 506, one or more cameras 512, one or more payment devices 514, one or more sensors 516, and one or more wireless charging ports 518.

Referring to FIG. 5B, detachable interactive interface 500 may further comprise casing 502A, one or more microphones 520, one or more power switches 524, one or more wired charging ports 526, one or more speakers 530, and one or more vents 534.

The detachable interactive interface 500 may further comprise mounting means 538 for securely attaching the interface 500 to a table frame (not shown). For example, a mounting means 538 may be coupled with corresponding hardware on a table frame in order to securely fasten the interface to the table frame.

The detachable interactive interface 500 may further comprise one or more power supply ports 540. The power supply port 540 may enable a wired power supply connection to the interface 500. Additionally or alternatively, the power supply port 540 may enable recharging of an embedded battery pack of the interface 500.

Referring to FIG. 5C, the detachable interactive interface 500 may further comprise an embedded power supply 542. The embedded power supply 542 may be, for example, a rechargeable battery pack which may be charged by connecting the interface 500 to a power source via power supply port 540.

In accordance with the present disclosure, the interactive interface of the smart dining table may be configured to concurrently communicate with a plurality of patrons. The interface may be configured to receive touch-based, voice-based inputs, or both from one or more patrons simultaneously and processing the inputs concurrently to provide simultaneous results to the one or more patrons. For example, if four patrons are seated around a table, each person may independently provide touch-based inputs to the interface and may receive respective outputs simultaneously. The interface may be configured to accept input and/or provide output on a small part of the display screen or on the entire display screen, as per user requirements.

According to an embodiment, the interface may be configured to present one or more sections or windows for simultaneously interacting with multiple patrons at the table. For example, referring to FIG. 1, touch-sensitive display 104 may be divided into four sections, each section for interacting with a patron seated at a corresponding side of the table

100. Each section of a touch-sensitive screen may be configured to independently receive touch-based inputs from a respective patron seated at the table. The interface may be configured to concurrently process simultaneous inputs on the multiple sections of the touch-sensitive screen and to independently display respective outputs to each patron via the respective sections.

The smart dining table interface may further be configured to concurrently receive and process one or more voice-based inputs from one or more patrons at the table. For example, referring to FIG. 1, a microphone may be near each of the four sides of the table 100 in order to independently capture simultaneous voice-based inputs from a respective patron seated around the table 100. The interface may be configured to concurrently process simultaneous voice-based inputs, along with any touch-based inputs, and to independently provide respective outputs to each patron. For example, the interface may simultaneously deliver audio output and/or display output in response to input from one or more patrons.

According to an embodiment, the technology used for enabling voice-based communications on the interface 102 may be Automatic Speech Recognition (ASR), Natural Language Processing (NLP), Text to Speech (TTS), Speech to text (STT), Voice Biometrics, Voice Command Interfaces, and Voice User Interface (VUI).

The smart dining table may be configured with a number of functionalities and features for automating and streamlining the restaurant dining experience. As previously discussed, the interface may receive touch-based inputs, voice-based inputs, or both from one or more patrons at the table, and provide outputs to the patrons in one or both of audio and visual formats. The interface may process inputs from patrons in order to provide automated, real-time assistance in the food selection and ordering process. The interface may further facilitate placing a food order and provide notifications regarding the status of a food order. The interface may further offer a variety of entertainment options to improve patrons' experience while seated at the table. The interface may further enable patrons to complete payments while seated at the table.

Figure 6:
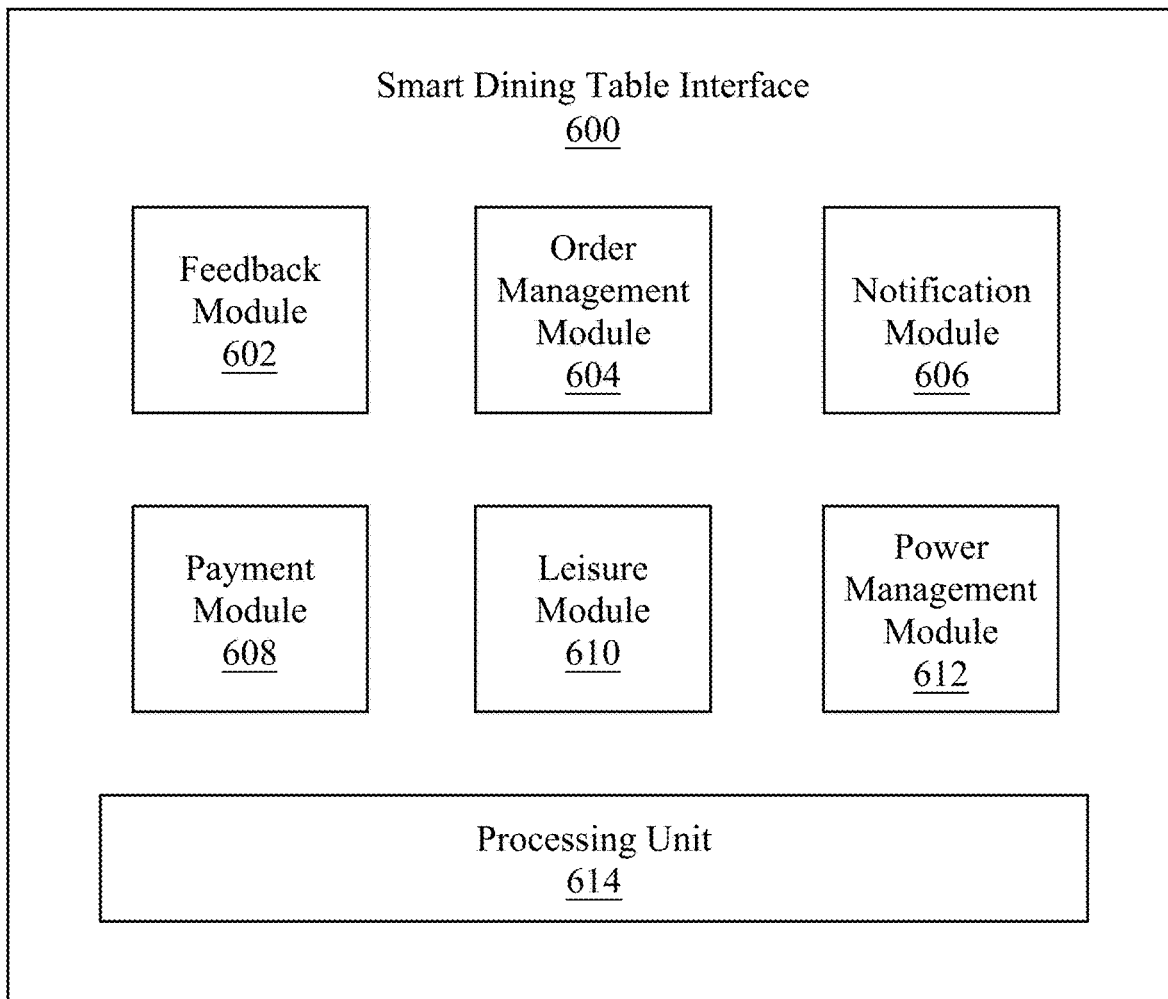
FIG. 6 illustrates a block diagram of exemplary modules of a smart dining table interface, in accordance with the present disclosure.

FIG. 6 illustrates an exemplary configuration of components of an interactive smart dining table interface in accordance with the present disclosure. The interactive interface 600 may comprise a feedback module 602 configured to provide automated assistance to users in food selection and customization of menu. As a basic example, a patron seated at the table may say "I would like to order a pizza." The interface 600 may receive the spoken input through one or more microphones on the table, and may use its voice recognition system to convert the patron's spoken input into text. The feedback module 602 may parse the text generated by the voice recognition system to identify the term "pizza" as a keyword, and check the available menu for matching items. According to an embodiment, the feedback module 602 may apply a series of if-else conditions to parse the input and match it with available products and menu items. Additionally or alternatively, the feedback module 602 may employ natural language processing techniques to parse the input and match it with available products and menu items.

The feedback module 602 may provide one or more outputs corresponding to the matching menu items in response to input by one or more patrons. Continuing the above example, feedback module 602 may output a list of menu items corresponding to the term "pizza" for display to the patron. Additionally or alternatively, the feedback module may provide audio output corresponding to the matching menu items. According to an embodiment, the feedback module 602 may pass a text-based list of matching items to a Text-to-Speech converter of the voice recognition system to generate a spoken response to the patron. For example, the interface may provide a voice output listing the available types of pizza and prompting the patron for a selection. The voice output may be provided concurrently with a corresponding display on one or more touch-sensitive screens.

The feedback module 602 may further guide the user through available customization and/or add-on options. For example, in response to the patron selecting a type of pizza, the feedback module 602 may match the selection with available customization options. For example, the feedback module may identify and output a list of additional toppings for selection by the patron. Once the patron completes the order, the feedback module may output a confirmation of the order to the patron and may optionally direct the patron to other available menu items. For example, the interface may display the ordered item on the screen and speak a response such as, "You have ordered a pizza. Would you like to add anything else?"

The feedback module 602 may be trained by standard Artificial Intelligence-based machine learned neural network methods for enabling automated assistance on food selection and customization of menu. Additionally or alternatively, the feedback module 602 may be trained using deep neural networks based on large language models that are trained using a large amount of internet data and fine-tuned as per restaurant requirements. Additionally or alternatively, the feedback module 602 may be configured to employ active learning techniques to improve menu suggestions based on inputs and outputs processed by the interface.

In some embodiments, the feedback module 602 may be connected to a database of menu items, ensuring that the conditional logic is always up to date with the latest offerings. The database may be stored locally on one or more memory units of the interface 600, or it may be accessed remotely by interface 600 through a network.

The interface 600 may further an order management module 604 configured to place and monitor food orders. The order management module 604 may be integrated with the operational workflow of restaurant staff, which helps in order processing, programmed alarming, and two-way communication between patron(s) and the restaurant staff. As previously discussed, the interface may receive touch-based inputs, voice-based inputs, or both indicating a desire by one or more patrons to order one or more menu items. The order management module 604 may process the received input(s) in order to place the order with the restaurant staff. For example, the order management module 604 may be configured to be in network communication with a restaurant's ordering system in order to communicate food orders and updates.

According to some embodiments, the order management module 604 may comprise an internal clock which is linked to the restaurant's ordering system. Once an order is placed by a patron, the clock may be monitored concurrently with signals from the restaurant's ordering system in order to provide status updates to one or more patrons at the table. For example, the interface 600 may output an alarm to inform the patron that the food is ready or that the food is halfway prepared. Likewise, the two-way communication may enable patrons to enquire about the delay in delivery of food, the status of food, or anything else related to the restaurant, restaurant staff, or food order.

According to an embodiment, the order management module 604 is connected to at least one camera, at least one microphone, and at least one speaker on the table to enable two-way communication between patron(s) and the restaurant staff as and when required.

According to some embodiments, the interface 600 may further comprise a notification module 606 for providing real-time updates on the order status and estimated time of arrival of the food items. In some embodiments, the real-time updates on the order status and the estimated time of arrival of the food items may be provided via a display on the table. In other embodiments, the real-time updates on the order status and the estimated time of arrival of the food items may be provided via one or more speakers on the table. In some embodiments, both audio and visual outputs may be provided by the notification module 606.

According to an embodiment, the notification module outputs notifications based on signals received from the order management module 604. For example, the status of a food order may be updated by the order management module 604 based on real-time inputs from the restaurant's staff using an integrated restaurant ordering system such as a Point of Sale (POS) device or an Admin Application. Each time the staff updates the order status (e.g., order received, preparing, ready for pickup) via a restaurant ordering system, the order management module 604 may responsively update the status of the order at the interface 600. The notification module 606 may monitor updates by the order management module 604 and responsively output the updates to the patron(s). Further, the delivery time of the food may be calculated based on the average preparation time of the ordered dishes and the current kitchen load. This information may be dynamically updated and displayed by the notification module 606.

According to an embodiment, the smart table interface 600 may further a payment module 608 that includes a plurality of payment methods, operable for enabling the patron(s) to complete payments directly from the table. The payment module 608 may communicate with one or more payment processing services over a network. The plurality of payment methods in the payment module 608 enables both contact-based payments and contact-less payments. For example, payment module 608 may be configured to process one or more contact-based payment methods such as cash deposits, credit/debit card payments, pin-based transactions, magnetic stripe card payments, or the like. Additionally or alternatively, payment module 608 may be configured to process one or more contact-less payment methods such as contactless debit/credit cards like cards equipped with Near Field Communication (NFC) technology; payments through mobile wallets like Amazon Pay, Google Pay, and Samsung Pay; QR code based payments like Alipay and WeChat Pay; NFC enabled tap to pay transactions; Radio Frequency Identification (RFID) payment; Bluetooth payments like Beacons and Poynt; Biometric payments like Amazon One; other online payment gateways like Paypal, Stripe, and Square. According to an embodiment, payment module 608 may be configured to communicate with one or more payment devices affixed to the table in order to receive payment from a patron.

According to an embodiment, the interface 600 may further comprise a leisure module 610 that includes a set of interactive applications operable by the patron(s) for elevating their experience by offering entertainment and interaction options. The leisure module 610 may comprise one or more educational apps such as Amazon Kindle, dictionary, and learning games; entertainment apps which offer music, movies, live/recorded shows, and/or serials; social media apps; informative apps like tracking apps, weather information display apps, calendar, calculator; or the like.

According to an embodiment, the leisure module 610 is connected to one or more cameras, microphones, and/or speakers on the table in order to enable the patron(s) to interact with the set of interactive applications in any suitable manner.

The smart table interface 600 may further comprise a power management module 612 configured for managing and optimizing the power inflow and outflow of the interface. The power management module 612 may be configured to be in communication with external power sources, rechargeable power sources, or both. Power management module 612 may monitor the state of one or more power sources of the smart table interface in order to optimize power management in real-time.

According to some embodiments, the power management module 612 may facilitate external charging through electric ports. In some embodiments, the power management module 612 may comprise battery-based backup power sources which may be recharged as per requirement. In some embodiments, both externally powered and rechargeable backup power sources may be deployed.

According to some embodiments, the power management module 612 may further comprise an energy management unit incorporating one or more detection devices and one or more modes of operation for saving power outflow. For example, a detection device may include one or more of sensors on the table and modes of operation may include one or more of a sleep mode and a full-power mode, wherein the sleep mode may be activated during non-operational hours responsive to a detection of a lower level of light intensity, and wherein the interface may quickly resume to full-power operation responsive to a detection of a higher level of light intensity.

According to an embodiment, the smart dining table interface 600 may further comprise a processing unit 614 configured to control and manage the overall operation of the interface. The processing unit 614 may be responsible for processing all inputs and outputs of the interface 600 including touch-based inputs, voice-based inputs, camera inputs, sensor inputs, and the like. The processing unit 614 may further be configured to execute one or more modules of the interface 600 and/or manage data communication between the one or more modules of interface 600.

According to an embodiment, the interface 600 may provide ambient lighting that may be adjustable based on the time of the day and/or the current ambiance settings of the surroundings. The feature of ambient lighting in the interface serves in power management and conservation of the interface's power, reduces eye strain by maintaining an appropriate brightness level for different lighting conditions, and ensures that the interface is always readable regardless of the surrounding lighting conditions, thus improving the overall user experience.

According to an embodiment, one or more light sensors on the table may be integrated with the power management module 612 and the processing unit 614 for functionalizing adjustable ambient lighting. The processing unit 614 may apply adaptive lighting algorithms to analyze data from the ambient light sensors to dynamically adjust the interface display. For example, the processing unit 614 may monitor and adjust the screen brightness and/or color temperature of the interface display responsive to detected ambient conditions, wherein the programmed goal may be to provide optimal visibility and/or to reduce eye strain based on the current lighting conditions.

In some embodiments, the interface's backlighting, typically provided by LED displays, may be automatically adjusted in real-time. This can involve changing the brightness levels and sometimes the color temperature of the LED display to match the ambient light.

According to an embodiment, when an ambient light sensor detects low light conditions, the screen brightness may be reduced to prevent glare and eye strain. Conversely, in bright conditions, the brightness may be increased to improve visibility.

In some embodiments, the color temperature of the interface may also be adjusted based on the color temperature of the ambient environment. In an instance, in cooler, bluish light environments, the interface may adopt a cooler color temperature. In warmer, yellowish light environments, the interface may shift to a warmer color temperature.

Figure 7:
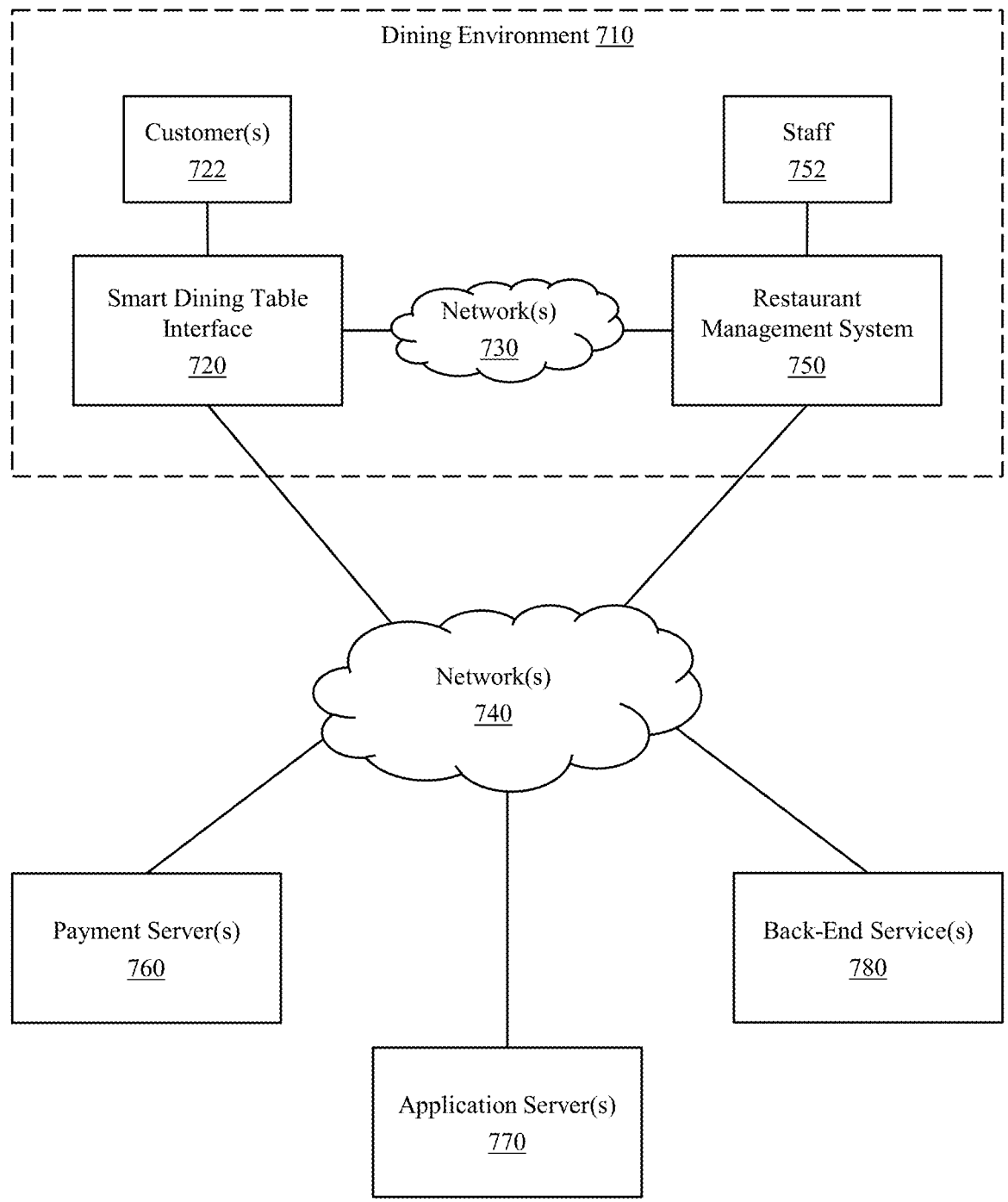
FIG. 7 illustrates an exemplary network environment for implementing a smart dining table interface in accordance with the present disclosure.

FIG. 7 illustrates an exemplary network environment for implementing a smart dining table interface in accordance with the present disclosure. Network environment 700 may comprise a dining environment 710. In some embodiments, dining environment 710 may be a physical location or establishment where dining services are offered to customers, such as a restaurant, a café, a bar, a banquet hall, a cafeteria, or the like. Dining environment 710 is shown here for exemplary purposes only and is not meant to exclude alternative physical or logical arrangements of the elements 720-780.

Network environment 700 may further comprise a smart dining table interface 720 in accordance with the embodiments described herein. For example, smart dining table interface 720 may comprise a dining table which is situated in dining environment 710. Smart dining table interface 720 may be configured for interaction with one or more customers 722 in accordance with the embodiments described herein.

Smart dining table interface 720 may be connected to one or more networks 730 and/or 740. Networks 730 and 740 may comprise any wired and/or wireless network including, but not limited to, a local area network (LAN), a wide area network (WAN), an enterprise network, or any combination of thereof. In some embodiments, networks 730 and 740 may include the Internet, an intranet, or an extranet. In some embodiments, networks 730 and 740 may incorporate a plurality of network devices, such as servers, routers, switches, load balancers, gateways, firewalls, or other hardware or software components configured to facilitate data transmission. Networks 730 and 740 may operate using any suitable network protocol including, but not limited to, Transmission Control Protocol/Internet Protocol (TCP/IP), User Datagram Protocol (UDP), Hypertext Transfer Protocol (HTTP), or other communication protocols.

Smart dining table interface 720 may be configured to communicate with a restaurant management system 750 over one or more networks 730 and/or 740. Restaurant management system 750 may comprise one or more computing devices responsible for automating various operations of a dining establishment. Restaurant management system 750 may be configured for interaction with one or more staff members 752. In some embodiments, restaurant management system 750 may comprise one or more user devices configured for interaction with staff 732, such as point-of-sale (POS) devices, kitchen consoles, desktop computers, laptop computers, tablet devices, smart watches, or any other device capable of data communication over a network. Staff 732 may interact with the one or more user devices to receive customer notifications, confirm customer orders, submit order updates, process payments, update reservations or table assignments, or the like. These devices may be situated within dining environment 710 or they may be configured to be portable and carried by one or more staff members 732.

Restaurant management system 750 may communicate with one or more external servers (not shown) responsible for delivering user applications for order routing, menu management, inventory management, scheduling, or the like. Restaurant management system 750 may store up-to-date, structured data related to menu items, order configurations, promotional offers, sales transactions, inventory levels, employee profiles, customer data, or the like. This data may be used to provide real-time updates to ensure that staff members 732 receive accurate and timely information.

Smart dining table interface 720 may interact with restaurant management system 750 in order to provide automated dining services to customers seated at a dining table. Smart dining table interface 720 may be integrated with one or more databases of restaurant management system 750 in order to automatically incorporate updates to dining information such as menu items, order configurations, promotional offers, or the like. In embodiments where smart dining table interface 720 maintains a local database of such dining information, updates by the restaurant management system 750 may be automatically imported into smart dining table interface 720 and mapped to the local data structures. Smart dining table interface 720 may be configured to automatically update its conditional feedback logic as dining information is updated. For example, restaurant management system 750 may update a menu to include a new specialty pizza along with a limited time promotion on the new specialty pizza. Smart dining table interface 720 may detect the update to restaurant management system 750 and automatically reconfigure the conditional feedback logic to incorporate the new menu item and the promotion. For example, the conditional feedback logic may be reconfigured such that when a user provides a spoken input "I would like to order a pizza," the smart dining table interface 720 returns a list of menu items including the new specialty pizza. The new specialty pizza may comprise a visual indicator or may be displayed at the top of the list of returned menu items, or otherwise visually highlighted, in order to alert the patron to the available promotion. Smart dining table interface 720 may also identify one or more dates during which a promotion is offered by the dining establishment and schedule automatic updates to menu offerings accordingly.

Smart dining table interface 720 may also communicate with restaurant management system 750 to deliver real-time updates to both patrons and staff members. For instance, smart dining table interface 720 may be integrated with operational workflows of restaurant management system 750 in order to coordinate order processing, programmed alerts, and two-way communication between patrons and the restaurant staff. Smart dining table interface 720 may include an internal clock which is linked to an ordering system of the restaurant management system 750. Once an order is placed by a patron, the smart dining table interface 720 may monitor the internal clock concurrently with signals received from the restaurant management system 750 in order to provide status updates to one or more patrons at the table. Similarly, updates received from users at the smart dining table interface 720, such as order updates, requests for services, or the like, may be transmitted to the restaurant management system 750 in real-time in order to promptly inform staff members regarding customer needs.

In some embodiments, smart dining table interface 720 may include one or more indicator devices for notifying users of various updates throughout the dining process. Indicator devices may include indicator lights, such as LED indicators, which may be used to inform staff members regarding service requests, order status, table conditions, or the like. For example, a red light may indicate that a customer is requesting service at table, a yellow light may indicate that an order has been placed, a green light may indicate that an order has been delivered, and a blue light may indicate that a table needs to be cleaned. These devices may be integrated with the restaurant management system 750 to coordinate updates between restaurant staff and patrons seated at the table.

In some embodiments, restaurant management system 750 may maintain user accounts associated with customers of a dining establishment. Smart dining table interface 720 may provide functionality to customers for setting up and managing user accounts while seated at the dining table. For example, smart dining table interface 720 may provide one or more graphical user interfaces to allow users set up and/or enter login credentials. Once a user logs into their restaurant account, smart dining table interface 720 may communicate with the restaurant management system 750 to retrieve order histories, rewards information, personalized offers, or the like.

Smart dining table interface 720 may also communicate with one or more payments servers 760 in order to facilitate automated payment processing functions for customers seated at a dining table. As discussed herein, smart dining table interface 720 may comprise one or more payment devices configured to receive one or more forms of payment from users. For example, payment devices may comprise one or more contact-based payment devices, contactless payment devices, or combined contact-based and contactless payment devices. In order to process customer payment through one of these payment devices, smart dining table interface 720 may transmit to payment server(s) 760 an identification of the customer(s), an identification of the smart dining table interface 720, a price of the ordered menu items, and customer payment information for processing. Once payment processing is successfully completed at the payment server(s) 760, smart dining table interface 720 may receive a digital confirmation and/or receipt corresponding to the payment. Smart dining table interface 720 may display a payment confirmation to the one or more customers, print a receipt using the one or more payment devices, transmit a digital payment receipt to one or more customer devices, store payment information in association with one or more customer accounts, or any combination thereof.

In some embodiments, payment processing by smart dining table interface 720 may be carried out through interaction with restaurant management system 750, wherein restaurant management system 750 may be in direct communication with one or more payment servers 760 in order to carry out payment operations.

Smart dining table interface 720 may further communicate with one or more application servers 770 in order to provide one or more interactive applications to enhance the dining experience. Application server(s) 770 may be configured to provide one or more interactive applications and/or content items to devices over a network. Application server(s) 770 may host one or more gaming applications, educational applications, content streaming applications, social media applications, informational applications, or any other application which may be implemented to engage the user while waiting for dining services. In some embodiments, smart dining table interface 720 may authenticate user credentials for accessing paid or subscriber-only services hosted by application server(s) 770.

Smart dining table interface 720 may further communicate with one or more back-end services 780 in order to carry out one or more back-end data processing operations. Back-end service(s) 780 may include input/output processing, data storage and access, user authentication, application hosting, data logging, data analytics, or any other back-end services which may be required for operation of the smart dining table interface 720. In some embodiments, one or more back-end services 780 may be responsible for converting voice-based inputs to text. In some embodiments, one or more back-end services 780 may implement advanced voice recognition techniques to disambiguate voice-based inputs received at smart dining table interface 720. In some embodiments, one or more back-end systems 780 may be responsible for model training operations to enhance the feedback models of smart dining table interface 720. In some embodiments, one or more back-end services 780 may be responsible for data syncing between systems of the network environment 700.

Figure 8:
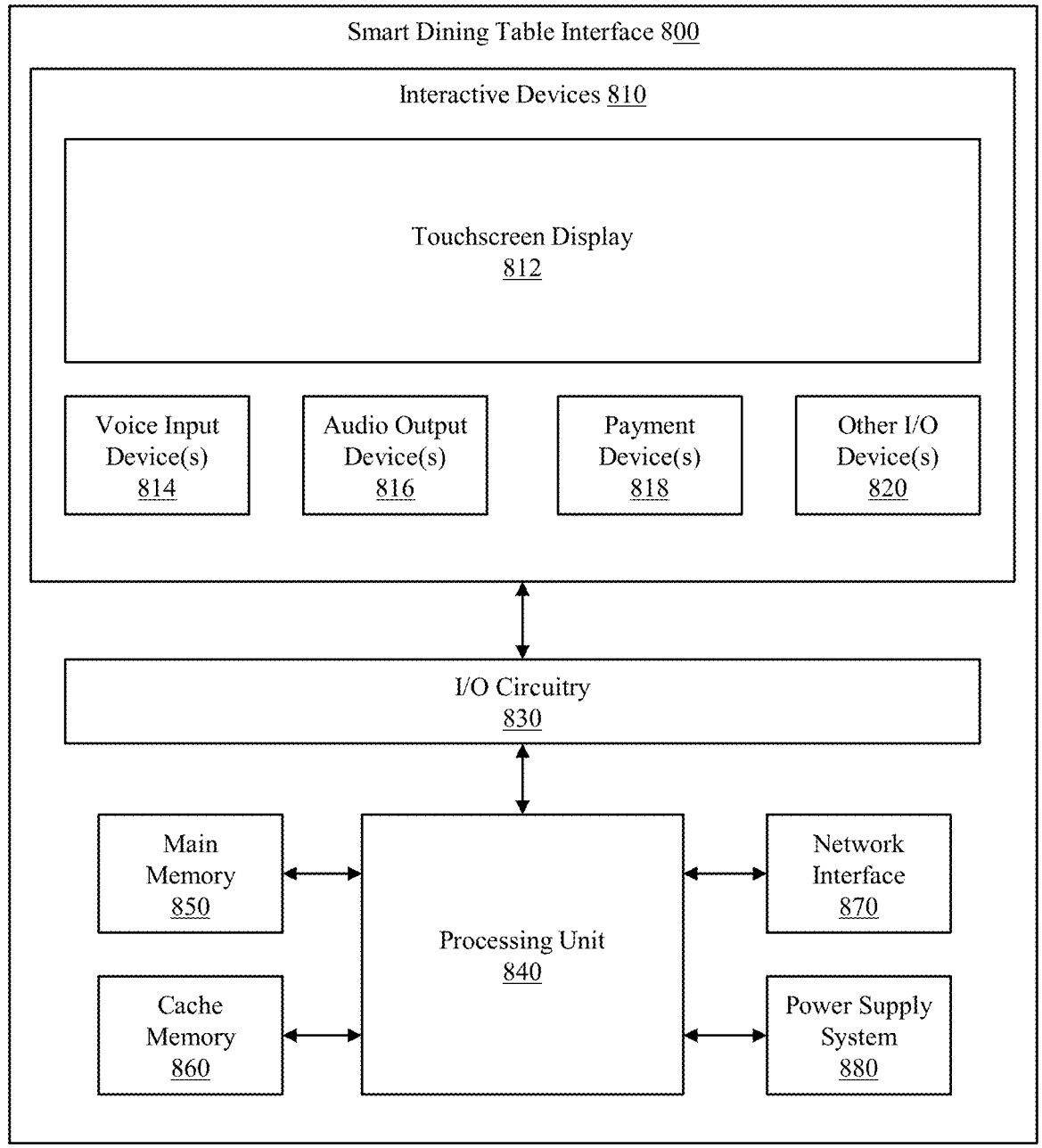
FIG. 8 illustrates a functional block diagram of a smart dining table interface in accordance with the present disclosure.

FIG. 8 illustrates a functional block diagram of a smart dining table interface 800 in accordance with the present disclosure. Smart dining table interface 800 may be implemented as a tabletop which may be detachably or fixedly connected to a table frame to form a smart dining table in accordance with the techniques discussed herein.

Smart dining table interface 800 may include interactive devices 810 to enable direct interaction with one or more users seated at the table. Interactive devices 810 may comprise a touchscreen display 812, one or more voice input devices 814, one or more speakers 816, one or more payment devices 818, and one or more other I/O devices 820. Interactive devices 810 may be physically positioned on the smart dining table interface 800 in accordance with the embodiments presented herein. For example, one or more interactive devices 810 may be positioned near or along a top or side surface of the tabletop such that they are accessible to one or more users seated around the dining table.

Touchscreen display 812 may be responsible for detecting touch-based inputs and rendering visual outputs. Touchscreen display 812 may include one or more display panels which serves as the primary visual interface for one or more users seated around the table. The display panel may be configured to display high-resolution images, videos, and dynamic content, and it may be configured to support a wide range of colors and brightness levels to enhance visibility under different lighting conditions. The display may be implemented using various technologies, such as a light emitting diode (LED) display, a liquid crystal display (LCD), an organic light emitting (OLED) display, an active matrix organic light emitting diode (AMOLED) display, a micro light emitting diode (MicroLED) display, a quantum dot display, a miniature light emitting diode (Mini-LED) display, a laser phosphor display (LPD), an electronic ink (E-Link) display, a holographic display, a plasma display, or the like.

Touchscreen display 812 may further include a touch-sensitive layer responsible for detecting touch-based inputs from one or more users. The touch-sensitive layer may comprise a multi-touch sensing layer capable of detecting and distinguishing multiple simultaneous points of contact. The touch-sensitive layer may be capable of detecting and distinguishing single touch inputs, multi-touch inputs, pressure-based inputs, hover inputs, swipe or flick inputs, gesture-based inputs, environmental or non-user inputs, other types of touch-based inputs, or combinations thereof. The touch-sensitive layer may be implemented using various technologies, such as capacitive touch screen, resistive touch screen, infrared touch screen, surface acoustic wave (SAW) touch screen, optical imaging display, or the like.

Voice input device(s) 814 may include one or more hardware components configured to capture sound waves, including spoken commands or ambient audio. A voice input device 814 may be implemented as a microphone, a microphone array, or any sensor capable of detecting acoustic signals. One or more voice input devices may be positioned on or near an outer surface of the smart dining table interface 800 such that they are capable of detecting spoken inputs from one or more users seated around the table. In some embodiments, one or more microphones may be arranged on the tabletop such that acoustic detection is focused on a specific direction (e.g., towards a specific side of a tabletop which coincides with a user's seated position), thereby enhancing voice-recognition accuracy and minimizing background noise. In some embodiments, one or more multidirectional microphones may be implemented to receive inputs from multiple locations around the table.

Audio output device(s) 816 may include one or more hardware components configured to provide audible feedback to users. An audio output device 816 may include a speaker, a speaker array, a buzzer, or the like. One or more audio output devices 816 may be positioned on or near a surface of the tabletop such that audio outputs may be perceived by one or more users seated around the table.

One or more payment device(s) 818 may be configured to allow users to complete financial transactions at the table. Payment devices 818 may be contact-based or contactless payment devices. Contact-based payment devices may include hardware components designed to process transactions through physical interactions, such as cash deposits, card payments, pin-based transactions, or the like. Contactless payment devices may include hardware components designed to process contactless transactions, such as magnetic or chip-based card readers, Near Field Communication (NFC) technology, QR code scanners, barcode scanners, RFID technology, or the like. In some embodiments, biometric sensors, such as fingerprint readers, may be included with one or more payment devices 818 to improve security when completing payments. One or more payment devices 818 may be positioned along a surface or an edge of the tabletop to allow accessibility to one or more users seated at the table. For example, one or more contactless payment readers may be positioned near the touchscreen display 812 such that it is accessible through the top surface of the tabletop.

Other I/O device(s) 820 may be included to support additional means of input from and/or output to users of the smart dining table interface 800. For instance, one or more other I/O devices 820 may include a camera, a light sensor, an indicator light, an electronic charging port, a network connection port, a keyboard, a keypad, a mouse, a button, a switch, or any other hardware capable of receiving inputs from and/or providing outputs to users in accordance with the embodiments described herein. Other I/O devices 820 may be positioned on, along, or near a surface of the smart dining table interface 800 such that they are accessible to users seated around the table.

Smart dining table interface 800 may further include I/O interface 830 responsible for pre-processing and/or routing inputs received from interactive devices 810 and outputs sent to interactive devices 810. I/O interface 830 may be implemented as hardware, software, or a combination of hardware and software. In some embodiments, I/O interface 830 may include one or more dedicated controllers or chipsets for managing data flow to and/or from each of the interactive devices 810. In some embodiments, one or more components of I/O interface 830 may be built into one or more interactive devices 810.

Smart dining table interface 800 may further include a processing unit 840 which is responsible for carrying out data processing operations. Processing unit 840 may be implemented in hardware, firmware, or a combination of hardware and software. Processing unit 840 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), another type of processing component, or combinations thereof. Processing unit 840 may include one or more processors capable of being programmed to perform a function. In some embodiments, processing unit 840 may comprise one or more hardware and/or software components of I/O interface 830.

Smart dining table interface 800 may further include a main memory 850 which is responsible for storing information and/or software related to the operation and use of smart dining table interface 800. Main memory 850 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Smart dining table interface 800 may further include a cache memory 860 responsible for storing instructions for use by processing unit 840 during operation of the smart dining table interface 800. Cache memory 860 may include one or more memories such as a random-access memory (RAM), a read-only memory (ROM), a flash memory, a magnetic memory, an optical memory, and/or another type of dynamic or static storage device that stores information and/or instructions for use by processing unit 840.

Smart dining table interface 800 may further include a network interface 870 responsible for enabling data communication between smart dining table interface and one or more wired or wireless communication networks. Network interface 870 may implemented as one or more network interface controllers, transceivers, network adapters, and/or other device configured to enable data communication over a network.

Smart dining table interface 800 may further include a power supply system 880 for supplying power to the components of smart dining table interface 800. Power supply system 880 may include one or more embedded or removable power sources, such as a rechargeable battery pack. Power supply system 880 may include one or more power sources which act as a primary power supply and one or more power sources which act as a backup power supply. Power supply system may include one or more power supply ports or adapters configured to connect to one or more external power sources. Power supply system 880 may include one or more sensors, such as a current sensor, a voltage sensor, and/or other electrical sensors configured to monitor voltage fluctuations across electrical components of the smart dining table interface 800. Power supply system 880 may interact with processing unit 840 in order to manage system power states based on user inputs, ambient conditions, battery capacity, component power requirements, and/or energy management logic.

In some embodiments, components of smart dining table interface 800 may be interconnected through a communication bus (not shown). The communication bus may be any parallel or serial bus system, such as system-on-a-chip (SoC), peripheral component interconnect (PCI), peripheral component interconnect express (PCIe), universal serial bus (USB), or the like.

Software instructions may be read into main memory 850 and/or cache memory 860 from another computer-readable medium or from another device via I/O interface 830 or network interface 870. When executed, software instructions stored in main memory 850 and/or cache memory 860 may instruct processing unit 840 to perform one or more processes described herein. Additionally, or alternatively, hardwired circuitry may be used in place of or in combination with software instructions to perform one or more processes described herein.

Figure 9:
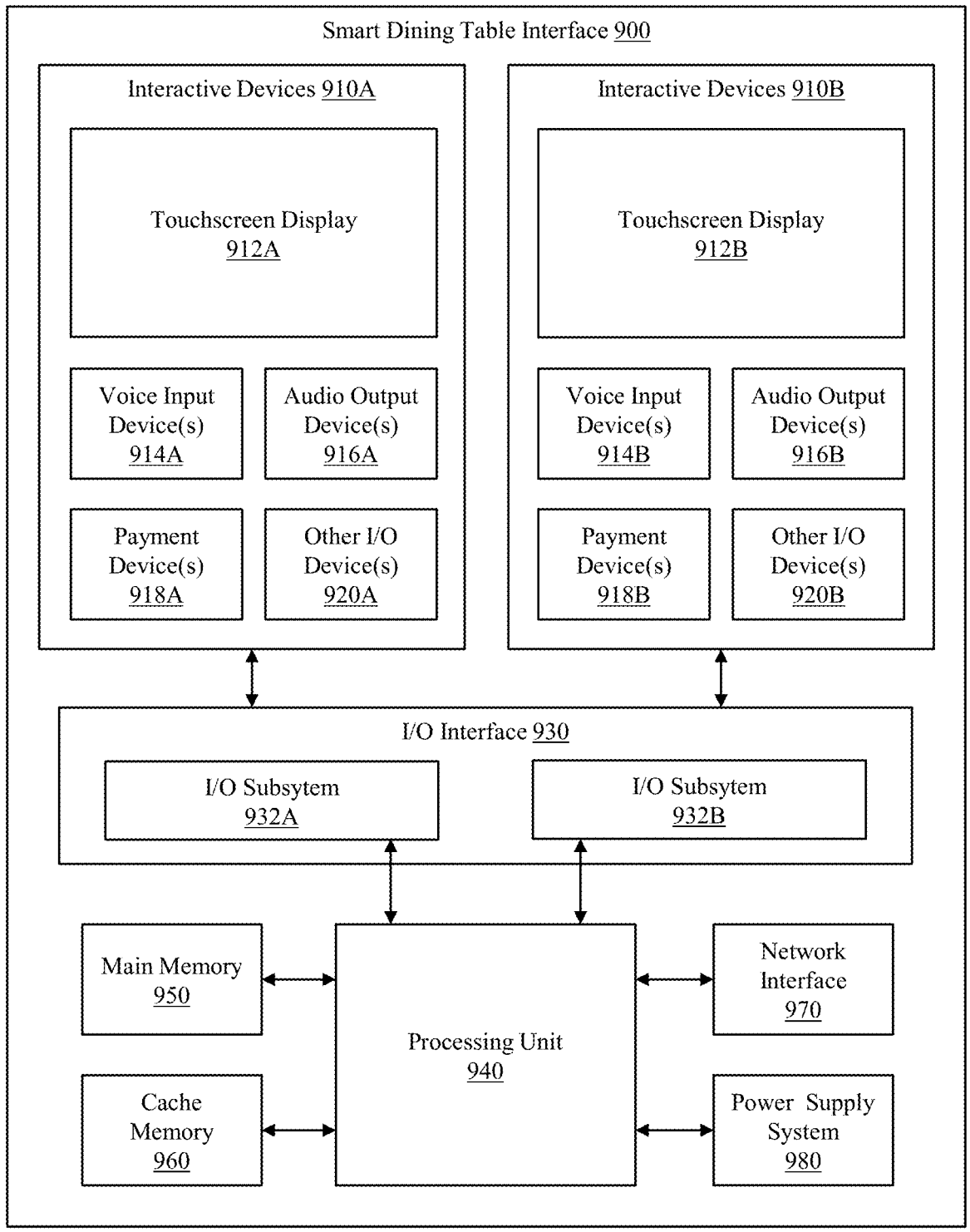
FIG. 9 illustrates a functional block diagram of a smart dining table interface in accordance with the present disclosure.

FIG. 9 illustrates a functional block diagram of a smart dining table interface 900 in accordance with the present disclosure. Smart dining table interface 900 may be implemented as a tabletop which may be detachably or fixedly connected to a table frame to form a smart dining table in accordance with the techniques discussed herein.

In contrast with smart dining table interface 800, the smart dining table interface 900 may include two or more logical groups of interactive devices, such as 910A and 910B, each responsible for interacting with users seated near a particular region of the smart dining table interface 900. In this manner, smart dining table interface 900 implements physical separation of hardware components in order to independently interact with one or more users seated at the table. For example, in implementations designed for two users seated across from each other at a dining table, a first set of interactive devices 910A may be dedicated for interaction with a first user seated on one side of the table while a second set of interactive devices 910A may be dedicated for interaction with a second user seated at the other side of the table. It should be emphasized that two sets of components are depicted here solely for the purpose of explanation. In practice, any number and/or arrangement of groupings may be implemented without departing from the scope of this disclosure.

Interactive devices 910A may include a touchscreen display 912A, one or more voice input devices 914A, one or more audio output devices 916A, one or more payment devices 918A, and one or more additional I/O devices 920A. These devices may include components similar to those described with respect to devices 812-820, respectively, of the smart dining table interface 800.

Interactive devices 910B may include a touchscreen display 912B, one or more voice input devices 914B, one or more audio output devices 916B, one or more payment devices 918B, and one or more additional I/O devices 920B. These devices may include components similar to those described with respect to devices 812-820, respectively, of the smart dining table interface 800.

Smart dining table interface 900 may further include I/O interface 930 responsible for pre-processing and/or routing inputs received from interactive devices 910 and outputs sent to interactive devices 910. In contrast to I/O interface 830, the I/O interface 930 may include two or more I/O subsystems, such as I/O subsystem 932A and I/O subsystem 932B, each responsible for handling inputs and outputs corresponding to a particular subset of I/O devices 910. For instance, I/O subsystem 932A may include dedicated interface components corresponding to I/O devices 910A while I/O subsystem 932B may include dedicated interface components corresponding to I/O devices 910B. I/O subsystems 932A and 932B may be implemented as hardware, software, or a combination of hardware and software. In some embodiments, I/O subsystems 932A and 932B may include one or more dedicated controllers or chipsets for managing data flow to and/or from each of the interactive devices 910A and 910B, respectively. In some embodiments, one or more components of I/O interfaces 932A and/or 932B may be built into one or more interactive devices 910A and/or 910B, respectively. In some embodiments, one or more components may be shared by I/O subsystem 932A and 932B.

In some embodiments, I/O interface 930 may include one or more additional components (not shown) which are distinct from I/O subsystems 932A and 932B and are configured to manage data communication between one or more interactive devices 910 and internal processing components of the smart dining table interface 800.

Smart dining table interface may further include a processing unit 940, main memory 950, cache memory 960, network interface 970, and power supply system 980. These elements may include components similar to those described with respect to elements 840-880, respectively, of the smart dining table interface 800.

Figure 10:
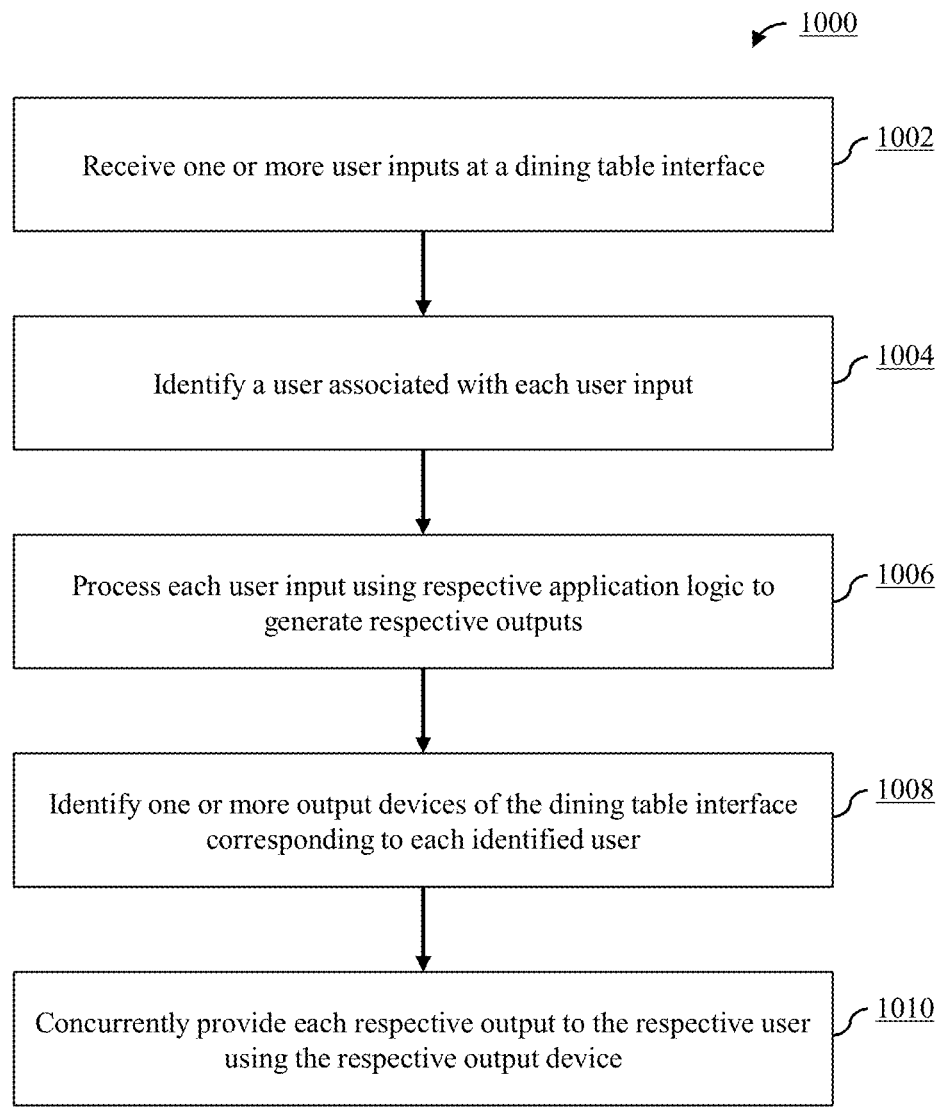
FIG. 10 illustrates an exemplary method for implementing the systems of the present disclosure.

FIG. 10 illustrates an exemplary method for implementing the systems of the present disclosure. The method 1000 illustrates an implementation in which two or more users may concurrently interact with a dining table interface to automate dining services.

The method may begin at step 1002 where the system receives one or more user inputs at a dining table interface.

A dining table interface may be a smart dining table interface in accordance with the present disclosure. The dining table interface may comprise one or more input devices for receiving inputs from one or more users seated at the table. For example, the dining table interface may comprise one or more touchscreen devices, one or more voice input devices, one or more payment devices, one or more cameras, and/or one or more other devices configured to receive user inputs.

User inputs may include touch-based inputs, voice-based inputs, or both, and may be received from one or more users seated around the dining table interface. Touch-based inputs may be received using one or more touchscreen devices, such as a touchscreen display, which may be positioned along or near the upper surface of the dining table interface. In some embodiments, a single touchscreen device may be made accessible to receive inputs from multiple users seated around the table. For example, referring to FIG. 1, touchscreen display 104 of smart dining table 100 may extend across a substantial portion of the table such that it is accessible users seated at each side of the table 100. In other embodiments, multiple touchscreen devices may be positioned along or near the tabletop surface such that each touchscreen device is accessible to one or more users seated in a particular location around the table. For example, referring to FIG. 2, touchscreen display 204A of smart dining table 200 may be responsible for receiving inputs from a user sitting on one side of the table while touchscreen display 204B may be responsible for receiving inputs from a user seated on another side of the table. Voice-based inputs may be received using one or more voice input devices, such as microphones or microphone arrays, which may be positioned along or near one or more surfaces of the dining table interface accessible to users seated at the table. In some embodiments, one or more voice input devices may be positioned in a central location along or near the upper surface of the dining table interface and may be configured to detect spoken inputs from users seated around the table. In other embodiments, one or more voice input devices may be positioned near the edges of the tabletop and may be dedicated to receiving inputs from users seated in a particular location at the table.

The dining table interface may be configured to receive simultaneous inputs from multiple users. Simultaneous inputs may include touch-based inputs, voice-based inputs, or both. In some embodiments, multiple users seated around the dining table may simultaneously provide touch-based inputs by interacting with respective regions of a single touchscreen display. For example, referring to FIG. 1, touchscreen display 104 may comprise a multi-touch screen capable of detecting multiple simultaneous points of contact. Simultaneous touch-based inputs may be detected in different regions of the touchscreen display 104 and attributed to one or more users using input processing techniques, as further described below. In some embodiments, two or more independent touchscreen displays may receive inputs simultaneously from two or more users seated around the dining table. For example, referring to FIG. 2, touchscreen displays 204A and 204B may each be dedicated to receiving inputs from users seated in a respective position around the smart dining table 200. Simultaneous inputs may be independently received by the two or more touchscreen displays and routed to the appropriate internal components for concurrent processing, as further discussed below. Voice-based inputs may simultaneously be received using one or more voice input devices of the dining table interface. For example, a plurality of voice input devices may each be dedicated to receiving inputs from a user seated in a respective position around the dining table, and simultaneous inputs from multiple users may be independently received by a respective voice input device. In implementations where a single voice input device is relied upon for receiving simultaneous inputs, advanced voice recognition techniques may be implemented in order to disambiguate multiple users seated around the table.

In some embodiments, user inputs may correspond to user login actions. The dining table interface may provide one or more graphical user interfaces for setting up and/or logging into an account associated with the dining table interface. For example, the account may be associated with a dining establishment in which the dining table interface is situated. Users may navigate the one or more graphical user interfaces using touch-based and/or voice-based commands to input credentials for logging in with a user account.

In some embodiments, user inputs may correspond to menu interactions or food ordering actions. For example, a user may interact through touch-based inputs and/or voice-based inputs to navigate and filter menus, and select menu items, enter quantities of items, customize items (e.g., flavors, toppings, or the like), select side items or add-ons, add items to a cart, view or edit cart details, apply coupons or discounts, place orders, or the like.

In some embodiments, user inputs may correspond to requests for services, such as water or coffee service, cleaning service, assistance from a staff member, or any other service which may be offered at a dining establishment.

In some embodiments, user inputs may correspond to one or more leisure applications which may be provided by the dining table interface, such as digital games, educational applications, content streaming applications, social media applications, informational applications, or any other application which may be implemented to engage the user while waiting for dining services.

In some embodiments, user inputs may correspond to payment transactions associated with the dining table interface. For example, users may interact through touch-based inputs and/or voice-based inputs to navigate to a payment screen for processing payment for the food order and/or other services (e.g., paid games, paid streaming applications, or the like). Once a user arrives at a payment screen, they may complete the payment transaction by interacting with one or more payment devices of the dining table interface. Additionally or alternatively, users may interact directly with one or more payment devices in order to navigate to a payment screen.

The method continues at step 1004, where the system identifies a user associated with each received user input.

In implementations having two or more touchscreen devices, each device may be dedicated to receiving touch-based inputs from a respective user seated in a particular position around the table. In these cases, hardware separation may be relied upon in order to distinguish touch-based inputs among a plurality of users. For instance, each touchscreen device may independently receive one or more inputs from the respective user. The received inputs may be transmitted through independent touch input channels for processing. The dining table interface may be configured to attribute inputs received from each input channel to a distinct user seated at the table.

For processing touch-based inputs using a single touchscreen device, the touchscreen device may be logically split into two or more sections such that inputs detected in each section are attributed to a user seated in a particular position relative to the dining table interface. For instance, raw touch data detected by the touchscreen device may be mapped to screen positions in a coordinate system. Inputs corresponding to a first set of screen positions may be attributed to a first user, inputs corresponding to a second set of screen positions may be attributed to a second user, and so forth. In some implementations, advanced touch-detection algorithms may be utilized to differentiate between user inputs. For example, one or more clustering algorithms may be used to group touch points based on spatial proximity, movement patterns, pressure patterns, or other attributes in order to associate touch-based inputs with a particular user.

In implementations having multiple dedicated voice input devices, channel separation may be relied upon in order to distinguish inputs received from multiple users. For instance, each voice input device may independently receive one or more spoken inputs from a respective user. The received inputs may be transmitted through independent audio input channels for processing. The dining table interface may be configured to attribute voice inputs received through each distinct audio input channel to a distinct user seated at the table.

For disambiguating voice inputs from multiple users received through a single audio stream, advanced techniques such as speaker diarization may be implemented in order to identify one or more speakers. Dining table interface may include or otherwise interact with a voice recognition system capable of identifying multiple speakers in a single audio stream by identifying characteristics of speakers, assigning each segment of speech to a speaker index, and labeling each segment with a speaker identifier based on the characteristics.

In some embodiments, voice-based inputs may be processed using a voice recognition system comprised within the dining table interface. In other embodiments, voice-based inputs may be processed by one or more external voice recognition systems accessible over a network. For example, the dining table interface may transmit raw audio input data to an external voice recognition service (e.g., through an application programming interface (API) or other means) and may receive labeled text segments in return. The labeled text segments may be mapped to a particular one or more users seated at the table.

The method continues at step 1006, where the system processes each user input using respective application logic to generate respective outputs.

Once user inputs have been distinguished between users seated at the table, the system may process each input accordingly. Inputs may be processed using one or more application modules as described herein. One or more inputs may invoke a feedback application or an order management application for processing menu interactions and/or order processing features. For example, the system may access lists of menu items in a database, filter the lists based on a received user input, and return a filtered list of items for output to the respective user. One or more inputs may invoke a payment processing application for completing payments at the dining table. One or more inputs may invoke a leisure application for providing entertainment options at the dining table.

In some embodiments, processing may include identifying a user account associated with a respective user input. For example, if a particular user has previously logged into the dining table interface, the user's account information may be retrieved and processed along with each input from that user. This may include retrieving and processing order histories, rewards information, personalized offers, or the like.

When multiple users are interacting with the dining table interface, the system may rely on parallel processing techniques, such as multithreading or asynchronous data processing, in order to concurrently process data streams in parallel. The system may maintain shared states or dynamic data objects in order to coordinate shared information among concurrent users. In some embodiments, the system may implement a state management layer to coordinate real-time processing of independent inputs and outputs. In some embodiments, the system may implement in-memory data to coordinate concurrent interactions in real-time. For example, a shared cart may be generated and maintained in a database. The shared cart may include data regarding all items ordered at the dining table during a particular session. As a plurality of users concurrently and independently add items to the order, the data in the shared cart is dynamically updated in real-time. The updates may be processed for real-time output to one or more output devices corresponding to one or more associated users, as discussed below.

The method may continue at step 1008, where the system identifies one or more output devices of the dining table interface corresponding to each identified user.

An output device may be a display device, such as a touchscreen display, or one or more specific sections of a display device associated with a particular user. Additionally or alternatively, an output device may be one or more audio output devices associated with a particular user. Additionally or alternatively, an output device may be one or more other output devices in accordance with the embodiments described herein.

Based on the data processing, the system identifies one or more output devices by which to deliver a respective output to one or more users. In some cases, an output need only be delivered to a user who initiated the input processing. For example, when a user is navigating a menu of items using touch-based inputs, each corresponding output (e.g., subsequent menu screens, details of selected items, or the like) may only be relevant to that particular user. For such outputs, the system may associate the output with an output device corresponding to the initiating user. For example, in response to a selection of a menu item in a particular section of a touchscreen display, the system may identify the same section of the touchscreen display for rendering an interactive display for adding the item to a cart. In other cases, outputs may be relevant to more than one user interacting with the table. For example, when a user adds an item to a shared cart, it may be beneficial to notify other users that the order has been updated. In such cases, outputs may be associated with multiple output devices for independent delivery to a plurality of users. For example, in response to an add-to-cart action, a notification may be output to a touchscreen display and/or an audio output device associated with each of the users seated at the table.

In some implementations, multiple output devices corresponding to multiple users may be identified. For example, when the dining table interface processes an update to a shared cart or shared order, a plurality of output devices may be identified in order to provide independent outputs to a plurality of users. In another example, where multiple users are concurrently engaging a shared leisure application (e.g., a multiplayer game, a shared streaming session, or the like), one or more output devices associated with each user may be identified for providing outputs in response to an input received from any one of the users.

The method may conclude at step 1010, where the system concurrently provides each respective output to the respective user using the respective output device.

Outputs may be provided to users concurrently in multiple regions of the dining table interface. In some embodiments, independent outputs may be concurrently displayed in two or more distinct touchscreen displays. In some embodiments, independent outputs may be concurrently displayed in two or more sections of a single touchscreen display (e.g., a split-screen display). In some embodiments, independent audio outputs may be transmitted through one or more speakers associated with each respective user.

In some embodiments, outputs may include one or more graphical user interfaces associated with user account management. For instance, the dining table interface may provide one or more graphical user interfaces for setting up and/or logging into an account associated with the dining table interface.

In some embodiments, outputs may include one or more graphical user interfaces associated with food ordering operations. For instance, the dining table interface may provide one or more graphical interfaces for navigating and filtering menus, selecting menu items, entering order, customizing items (e.g., flavors, toppings, or the like), selecting side items or add-ons, adding items to a cart, viewing or editing order details, applying coupons or discounts, placing orders, receiving order updates, requesting staff services, or the like.

In some embodiments, outputs may include one or more graphical user interfaces associated with one or more leisure applications which may be provided by the dining table interface, such as digital games, educational applications, content streaming applications, social media applications, informational applications, or any other application which may be implemented to engage the user while waiting for dining services.

In some embodiments, outputs may include one or more graphical user interfaces associated with to payment transaction processing. For example, users may interact through touch-based inputs and/or voice-based inputs to navigate to a payment screen for processing payment for the food order and/or other services (e.g., paid games, paid streaming applications, or the like). Once a user arrives at a payment screen, they may complete the payment transaction by interacting with one or more payment devices of the dining table interface. Additionally or alternatively, users may interact directly with one or more payment devices in order to navigate to a payment screen.

As outputs are provided, users may continue to interact with the dining table interface by providing additional inputs into the system. The system continues to process inputs from each of the plurality of users concurrently as they are received, and provides independent to one or more users as needed.

The following is an illustrative example of a use case which considers two users seated across from each other at a dining table comprising a smart dining interface of the present disclosure. The exemplary smart dining table interface may comprise one or more touchscreen displays and one or more voice input devices for receiving inputs from the two users.

The first user may speak an input, "I would like to order a pizza," and the second user may tap on a graphical icon to navigate to a food menu. The first user's input may be received through a microphone directed towards the first user. The input may be received through a dedicated audio input channel which allows the system to identify the first user by their seated position. The first user's spoken input may be processed using a voice recognition system to convert the spoken input into text. The generated text may be parsed to identify a menu and/or ordering operation which includes the term "pizza" as a keyword. A database of menu items may be accessed to retrieve available items matching the term "pizza." The resulting filtered list of available items may be output to a dedicated touchscreen display corresponding to the first user or to a section of a shared touchscreen display corresponding to the first user.

The second user's input may be received through a touchscreen device. The input may be received at a dedicated touchscreen device corresponding to the second user or it may be received in a section of a shared touchscreen device which corresponds to the second user. The second user's input may be processed to retrieve a complete list of available items for presentation to the second user. The complete list of menu items may be output to a dedicated touchscreen display corresponding to the second user or to a section of a shared touchscreen display corresponding to the second user.

One or more user inputs may be concurrently processed and updates may be concurrently provided in real-time during interaction by the first and second users. For example, the first user may select and add a pizza item to the cart while the second user is navigating the list of menu items. Once the first user's selection is processed and the cart is updated internally, the display output to the second user may automatically be updated to reflect the added item while the second user continues to navigate the menu. For example, a notification, such as a graphical icon or pop-up indicator, may be displayed to the second user in response to the first user adding an item to the cart.

Once the users have finished selecting their respective items, the order may be placed. Optionally, each user may have the ability to place the order using the dining table interface. The order may be transmitted over a network to a restaurant management system, which may notify the kitchen and/or wait staff that an order has been received.

Once the order has been transmitted, the dining table interface may begin monitoring the restaurant management system for order updates. The dining table interface may provide notifications to the users as order updates are received from the restaurant management system. For example, graphical indicators, such as textual messages, icons, pop-ups, or the like may be displayed to each user using the one or more touchscreen displays. Additionally or alternatively, audible outputs such as beeps or computer-generated speech may be provided to users through one or more speakers. Additionally or alternatively, one or more indicator devices on the dining table interface may be utilized to inform the users regarding orders status.

While waiting for their order to arrive, users may choose to interact with one or more leisure applications provided at the dining table interface. For example, the first user may choose to play a game while the second user may choose to stream a documentary. Using touch-based and/or voice-based commands, each user may independently navigate to a respective application and interact with the application in their respective region of the dining table interface.

At the completion of dining, the users may process payments directly at the table by through interaction with one or more payment devices installed on the interface. The first user and/or the second user may navigate to a payment screen which may display an order summary and a total cost of items. The first user and/or the second user may present a payment method to a payment device in order to render the payment. Once payment processing is complete, the dining table interface may display a payment confirmation on one or more touchscreen displays and/or transmit a digital receipt to a user associated with the payment.

The detailed description of the invention and the accompanying examples provided herein are intended to illustrate the principles of the invention and its practical applications. These embodiments are provided by way of example only and are not intended to limit the scope of the invention. It should be understood that various modifications, adaptations, and alternatives may be made without departing from the spirit and scope of the invention.

The invention may be practiced in a variety of forms and configurations beyond those explicitly disclosed, including but not limited to different combinations of hardware and software components, different computing environments, and different system architectures. The specific embodiments disclosed herein are illustrative and are not intended to limit the scope of the invention as set forth in the following claims.

It should be apparent to those skilled in the art that many more modifications besides those already described are possible without departing from the inventive concepts herein. Numerous modifications, changes, variations, substitutions, and equivalents will be apparent to those skilled in the art, without departing from the scope of the disclosure, as described in the claims. The foregoing description of the specific embodiments will so fully reveal the general nature of the embodiments herein that others can, by applying current knowledge, readily modify, adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the appended claims.

The invention claimed is:

1. A method for concurrently providing dining services to a plurality of users, the method comprising:
   receiving, by one or more processors at a tabletop comprising a touchscreen device and one or more voice input devices, a first input and a second input;
   concurrently processing, by the one or more processors, raw input data detected by the touchscreen device and the one or more voice input devices to determine a seat position associated with each of the first input and the second input, wherein each seat position corresponds to an interactive region of the touchscreen device;
   identifying, by the one or more processors, a first user corresponding to the first input and a second user corresponding to the second input, based on the respective seat positions;
   processing, by the one or more processors, the first input and the second input to generate a plurality of outputs;
   identifying, by the one or more processors, one or more interactive regions of the touchscreen device corresponding to each of the plurality of outputs based on the seat positions of the first user and the second user; and
   concurrently providing, by the one or more processors, each of the plurality of outputs in a respective interactive region of the touchscreen device.

2. The method of claim 1, wherein the first input and the second input are received simultaneously.

3. The method of claim 1, wherein processing the first input and the second input further comprises:
   retrieving, from one or more databases, a first list of menu items corresponding to the first input; and
   retrieving, from the one or more databases, a second list of menu items corresponding to the second input.

4. The method of claim 3, wherein the concurrently providing further comprises:
   displaying the first list of menu items in a first interactive region of the touchscreen device; and
   displaying the second list of menu items in a second interactive region of the touchscreen device.

5. The method of claim 1, wherein the first input comprises a selection from a list of menu items, the method further comprising:
   processing, by the one or more processors, the first input to update a shared cart stored in memory; and
   providing a notification in an interactive region of the touchscreen device associated with the second user indicating that the shared cart has been updated.

6. The method of claim 1, wherein processing the first input and the second input comprises concurrently processing the first input and the second input.

7. A dining table interface for concurrently providing dining services to a plurality of users, the dining table interface comprising:
   a tabletop comprising a touchscreen device and one or more voice input devices; and
   one or more processors configured to:
   concurrently process raw input data detected by the touchscreen device and the one or more voice input devices to determine a seat position associated with each of a first input and a second input, wherein each seat position corresponds an interactive region of the touchscreen device;
   identify a first user corresponding to the first input and a second user corresponding to the second input, based on the respective seat positions;
   process the first input and the second input to generate a plurality of outputs;
   identify one or more interactive regions of the touchscreen device corresponding to each of the plurality of outputs based on the respective seat positions of the first user and the second user; and
   concurrently provide each of the plurality of outputs in a respective interactive region of the touchscreen device.

8. The dining table interface of claim 7, wherein the first input and the second input are received simultaneously.

9. The dining table interface of claim 7, wherein processing the first input and the second input further comprises:
   retrieving, from one or more databases, a first list of menu items corresponding to the first input; and
   retrieving, from the one or more databases, a second list of menu items corresponding to the second input.

10. The dining table interface of claim 9, wherein the concurrently providing further comprises:
    displaying the first list of menu items in a first interactive region of the touchscreen device; and
    displaying the second list of menu items in a second interactive region of the touchscreen device.

11. The dining table interface of claim 7, wherein the first input comprises a selection from a list of menu items, and wherein the one or more processors are further configured to:
    process the first input to update a shared cart stored in memory; and
    provide a notification in an interactive region of the touchscreen device associated with the second user indicating that the shared cart has been updated.

12. The dining table interface of claim 7, wherein processing the first input and the second input comprises concurrently processing the first input and the second input.

13. A non-transitory computer-readable medium storing a set of instructions for concurrently providing dining services to a plurality of users, the set of instructions comprising one or more instructions that, when executed by one or more processors, cause the one or more processors to:
    receive, at a tabletop comprising a touchscreen device and one or more voice input devices, a first input and a second input;
    concurrently process raw input data detected by the touchscreen device and the one or more voice input devices to determine a seat position associated with each of the first input and the second input, wherein each seat position corresponds to an interactive region of the touchscreen device;
    identify a first user corresponding to the first input and a second user corresponding to the second input, based on the respective seat positions;
    process the first input and the second input to generate a plurality of outputs;
    identify one or more interactive regions of the touchscreen device corresponding to each of the plurality of outputs based on the respective seat positions of the first user and the second user; and
    concurrently provide each of the plurality of outputs in a respective interactive region of the touchscreen device.

14. The non-transitory computer-readable medium of claim 13, wherein the first input and the second input are received simultaneously.

15. The non-transitory computer-readable medium of claim 13, wherein the one or more instructions further cause the one or more processors to:
- retrieve, from one or more databases, a first list of menu items corresponding to the first input; and
- retrieve, from the one or more databases, a second list of menu items corresponding to the second input.

16. The non-transitory computer-readable medium of claim 13, wherein the first input comprises a selection from a list of menu items, and wherein the one or more instructions further cause the one or more processors to:
- process the first input to update a shared cart stored in memory; and
- provide a notification in an interactive region of the touchscreen device associated with the second user indicating that the shared cart has been updated.

\* \* \* \* \*